US012471997B2

(12) United States Patent
Michiels et al.

(10) Patent No.: US 12,471,997 B2
(45) Date of Patent: Nov. 18, 2025

(54) SYSTEMS AND METHODS FOR AUTOMATICALLY DETECTING ANATOMICAL FEATURES FOR PREOPERATIVE CARDIAC IMPLANT SIMULATIONS

(71) Applicant: FEops NV, Ghent (BE)

(72) Inventors: Kilian Michiels, Oostduinkerke (BE); Eva Heffinck, Kortrijk (BE); Patricio Astudillo, Drongen (BE)

(73) Assignee: FEops NV, Ghent (BE)

( * ) Notice: Subject to any disclaimer, the term of this patent is extended or adjusted under 35 U.S.C. 154(b) by 418 days.

(21) Appl. No.: 18/046,085

(22) Filed: Oct. 12, 2022

(65) Prior Publication Data
US 2023/0119535 A1    Apr. 20, 2023

Related U.S. Application Data

(60) Provisional application No. 63/265,557, filed on Dec. 16, 2021, provisional application No. 63/255,900, filed on Oct. 14, 2021.

(51) Int. Cl.
*A61B 34/10*      (2016.01)
*A61B 6/00*       (2024.01)
(Continued)

(52) U.S. Cl.
CPC ............ *A61B 34/10* (2016.02); *A61B 6/5205* (2013.01); *G06T 7/55* (2017.01); *G06T 19/003* (2013.01);
(Continued)

(58) Field of Classification Search
CPC . A61B 34/10; A61B 6/5205; A61B 2034/105; A61B 2034/107; G06T 7/55;
(Continued)

(56) References Cited

U.S. PATENT DOCUMENTS 8,126,234 B1    2/2012  Edwards et al.
8,315,812 B2   11/2012  Taylor
(Continued)

FOREIGN PATENT DOCUMENTS

CN    102346811 A    2/2012
CN    106037931 A   10/2016
(Continued)

OTHER PUBLICATIONS

Aguado, et al., In Silico Optimization of Left Atrial Appendage Occluder Implantation Using Interactive and Modeling Tools, Frontiers in Physiology, vol. 10, Article 237 (Mar. 2019).
(Continued)

*Primary Examiner* — Stephen S Hong
*Assistant Examiner* — Carl E Barnes, Jr.
(74) *Attorney, Agent, or Firm* — NK Patent Law

(57) ABSTRACT

Systems and methods for fully automated anatomical analysis of an anatomical structure are provided to facilitate pre-operative planning. The computerized method may include obtaining a plurality of images, e.g., MSCT images, of patient-specific cardiovascular anatomy, and analyzing the MSCT images with a trained artificial intelligence module to identify one or more anatomical landmarks and to construct a virtual three-dimensional model of the anatomical structure. For example, the trained artificial intelligence module may execute segmentation, point detection, curve detection, or plane detection deep learning modules, independently or in combination, to identify the anatomical landmarks. The method further may include deriving anatomical measurements of the one or more identified anatomical landmarks, and displaying the virtual three-dimensional model alongside the anatomical measurements of the one or more identified anatomical landmarks.

28 Claims, 21 Drawing Sheets

(51) Int. Cl.

| | |
|---|---|
| *G06T 7/55* | (2017.01) |
| *G06T 19/00* | (2011.01) |
| *G06V 10/26* | (2022.01) |
| *G06V 10/44* | (2022.01) |
| *G06V 10/774* | (2022.01) |
| *G06V 20/64* | (2022.01) |
| *G16H 30/20* | (2018.01) |
| *G16H 30/40* | (2018.01) |

(52) U.S. Cl.
CPC .............. *G06V 10/26* (2022.01); *G06V 10/44* (2022.01); *G06V 10/774* (2022.01); *G06V 20/64* (2022.01); *G16H 30/20* (2018.01); *G16H 30/40* (2018.01); *A61B 2034/105* (2016.02); *A61B 2034/107* (2016.02); *G06T 2200/24* (2013.01); *G06T 2207/30048* (2013.01); *G06T 2210/41* (2013.01); *G06T 2219/012* (2013.01); *G06V 2201/031* (2022.01)

(58) Field of Classification Search
CPC ............... G06T 19/003; G06T 2200/24; G06T 2207/30048; G06T 2210/41; G06T 2219/012; G16H 30/20; G16H 30/40; G06V 20/64; G06V 10/44; G06V 10/26; G06V 10/774; G06V 2201/031
See application file for complete search history.

(56) References Cited

U.S. PATENT DOCUMENTS

| | | | |
|---|---|---|---|
| 8,548,778 | B1 | 10/2013 | Hart et al. |
| 8,594,950 | B2 | 11/2013 | Taylor |
| 8,682,626 | B2 | 3/2014 | Ionasec et al. |
| 9,757,073 | B2 | 9/2017 | Goshen et al. |
| 9,805,463 | B2 | 10/2017 | Choi et al. |
| 9,839,399 | B2 | 12/2017 | Fonte et al. |
| 10,258,303 | B2 | 4/2019 | Grass et al. |
| 10,275,876 | B2 | 4/2019 | Reicher et al. |
| 10,456,094 | B2 | 10/2019 | Fonte et al. |
| 10,600,181 | B2 | 3/2020 | Petersen et al. |
| 10,695,131 | B2 | 6/2020 | Weber et al. |
| 10,789,772 | B2 | 9/2020 | Mortier et al. |
| 10,803,592 | B2 | 10/2020 | Grady et al. |
| 11,045,256 | B2 | 6/2021 | Mortier et al. |
| 11,051,885 | B2 | 7/2021 | Mortier et al. |
| 11,069,136 | B2 | 7/2021 | Mortier et al. |
| 11,238,587 | B2 | 2/2022 | Min et al. |
| 11,288,813 | B2 | 3/2022 | Grady et al. |
| 11,331,149 | B2 | 5/2022 | Mortier et al. |
| 12,186,021 | B2 | 1/2025 | De Beule et al. |
| 2004/0225212 | A1 | 11/2004 | Okerlund et al. |
| 2005/0043609 | A1 | 2/2005 | Murphy et al. |
| 2007/0135707 | A1 | 6/2007 | Redel et al. |
| 2008/0319448 | A1 | 12/2008 | Lavallee et al. |
| 2009/0082660 | A1 | 3/2009 | Rahn et al. |
| 2010/0042105 | A1 | 2/2010 | Park et al. |
| 2011/0153286 | A1* | 6/2011 | Zaeuner ................. G06T 19/00 703/1 |
| 2011/0182492 | A1 | 7/2011 | Grass et al. |
| 2011/0222750 | A1* | 9/2011 | Liao ......................... G06T 7/12 382/131 |
| 2012/0053466 | A1 | 3/2012 | Bianchi et al. |
| 2014/0219537 | A1 | 8/2014 | Carelsen et al. |
| 2015/0051884 | A1 | 2/2015 | Grady et al. |
| 2015/0112659 | A1* | 4/2015 | Mortier ................. A61B 34/10 703/11 |
| 2015/0112901 | A1 | 4/2015 | Singer |
| 2015/0178938 | A1 | 6/2015 | Gorman, III et al. |
| 2015/0178939 | A1 | 6/2015 | Bradski et al. |
| 2015/0182255 | A1 | 7/2015 | Shivkumar |
| 2015/0223773 | A1 | 8/2015 | John et al. |
| 2015/0235569 | A1 | 8/2015 | Babiker et al. |
| 2015/0370995 | A1 | 12/2015 | Wakai |
| 2016/0038246 | A1* | 2/2016 | Wang .................... A61B 6/504 600/587 |
| 2016/0128786 | A1 | 5/2016 | Weber |
| 2016/0166332 | A1* | 6/2016 | Wang .................... A61B 34/10 703/11 |
| 2016/0199198 | A1 | 7/2016 | Dietz et al. |
| 2016/0267673 | A1* | 9/2016 | Grbic .................... G16H 30/40 |
| 2016/0270859 | A1 | 9/2016 | Park et al. |
| 2017/0000562 | A1 | 1/2017 | Frank et al. |
| 2017/0150928 | A1 | 6/2017 | Del Alamo De Pedro et al. |
| 2017/0216062 | A1 | 8/2017 | Armstrong et al. |
| 2017/0258527 | A1 | 9/2017 | Wang et al. |
| 2017/0270663 | A1 | 9/2017 | Hoffmann et al. |
| 2017/0323481 | A1 | 11/2017 | Tran et al. |
| 2017/0360510 | A1 | 12/2017 | Bischoff et al. |
| 2018/0116725 | A1 | 5/2018 | Ashikaga et al. |
| 2018/0289422 | A1 | 10/2018 | Mortier et al. |
| 2018/0289488 | A1 | 10/2018 | Orth et al. |
| 2018/0365838 | A1 | 12/2018 | Lorenz et al. |
| 2019/0000551 | A1* | 1/2019 | Sone .................... A61B 6/5235 |
| 2019/0090951 | A1* | 3/2019 | Camus ................. A61B 8/5261 |
| 2019/0298450 | A1 | 10/2019 | Dasi et al. |
| 2019/0357981 | A1 | 11/2019 | Mortier et al. |
| 2019/0392942 | A1 | 12/2019 | Sorenson et al. |
| 2021/0022806 | A1* | 1/2021 | De Beule .............. A61F 2/2415 |
| 2021/0346097 | A1 | 11/2021 | Dasi et al. |
| 2022/0172848 | A1 | 6/2022 | De Bock et al. |
| 2022/0273369 | A1 | 9/2022 | Mortier et al. |
| 2022/0392642 | A1 | 12/2022 | Dasi et al. |
| 2023/0310080 | A1* | 10/2023 | Lee ......................... G06T 7/136 345/419 |

FOREIGN PATENT DOCUMENTS

| | | |
|---|---|---|
| CN | 108766539 A | 11/2018 |
| DE | 102012205504 A1 | 10/2013 |
| WO | WO-2013156546 A2 | 10/2013 |
| WO | WO-2013171039 A1 | 11/2013 |
| WO | WO-2014009294 A1 | 1/2014 |
| WO | WO-2016038169 A1 | 3/2016 |
| WO | WO-2016177647 A1 | 11/2016 |
| WO | WO-2018141927 A1 | 8/2018 |
| WO | WO-2019179793 A1 | 9/2019 |
| WO | WO-2020182651 A1 | 9/2020 |
| WO | WO-2022241425 A1 | 11/2022 |
| WO | WO-2022241432 A1 | 11/2022 |
| WO | WO-2023152326 A1 | 8/2023 |

OTHER PUBLICATIONS

Antiga, et al., An Image-Based Modeling Framework for Patient-Specific Computational Hemodynamics, Medical & Biological Engineering & Computing, 46(11):1097-1112 (Nov. 2008).

Auricchio, et al., Carotid Artery Stenting Simulation: From Patient-Specific Images to Finite Element Analysis, Medical Engineering and Physics, 33(3):281-289 (Apr. 2011).

Basri, et al., The Hemodynamic Effects of Paravalvular Leakage Using Fluid Structure Interaction; Transcatheter Aortic Valve Implantation Patient, Journal of Medical Imaging and Health Informatics, 6(5):1513-1518 (Oct. 2016).

Capelli et al., "Patient-Specific Simulations of Transcatheter Aortic Valve Stent Implantation," Med. Medical & Biological Engineering & Computing 2012, 50(2):183-192 (Feb. 2012).

De Santis, et al., Patient-Specific Computational Fluid Dynamics: Structured Mesh Generation from Coronary Angiography, Medical & Biological Engineering & Computing, 48(4):371-380 (Apr. 2010).

European Search Report dated Jul. 11, 2017 in EP Patent Appl. Serial No. 17154648.4.

European Search Report dated Oct. 2, 2018 in EP Patent Appl. Serial No. 18163655.6.

Extended EP Search Report dated Sep. 24, 2019 in EP Patent Appl. Serial No. 19161587.7.

Ghadimi, M.D., et al., Perioperative Conduction Disturbances After Transcatheter Aortic Valve Replacement, Journal of Cardiothoracic and Vascular Anesthesia, 27(6):1414-1420 (Dec. 2013).

(56) References Cited

OTHER PUBLICATIONS

Grbic, et al., Complete Valvular Heart Apparatus Model from 4D Cardiac CT, International Conference on Medical Image Computing and Computer-Assisted Intervention, pp. 218-226 (Dec. 2010).
International Search Report & Written Opinion dated Jun. 5, 2020 in Int'l PCT Patent Appl. Serial No. PCT/EP2020/056000.
International Search report and written opinion dated Jul. 15, 2016 in Int'l PCT Patent Application Serial No. PCT/EP2016/059688.
International Search report and written opinion dated Jul. 30, 2013 in Int'l PCT Patent Application Serial No. PCT/EP2013/058392.
International Search report and written opinion dated Jun. 4, 2018 in Int'l PCT Patent Application Serial No. PCT/EP2018/052701.
International Search report and written opinion dated May 31, 2019 in Int'l PCT Patent Application Serial No. PCT/EP2019/055907.
Lenoir, et al., Physics-Based Models for Catheter, Guidewire and Stent Simulation, Studies in health technology and informatics, 119:305-310 (2006).
Mill, et al., Sensitivity Analysis of In Silico Fluid Simulations to Predict Thrombus Formation After Left Atrial Appendage Occlusion, Mathematics, 9(18):2304-2323 (Jan. 2021).
Morganti, et al., Simulation of Transcatheter Aortic Valve Implantation through Patient-Specific Finite Element Analysis: Two Clinical Cases, Journal of Biomechanics, 47(11):2547-2555 (Aug. 2014).
Morlacchi, et al., Sequential Structural and Fluid Dynamic Numerical Simulations of a Stented Bifurcated Coronary Artery, Journal of Biomechanical Engineering, vol. 133, 11 pages (Dec. 2011).
Mortier, et al., A Novel Simulation Strategy for Stent Insertion and Deployment in Curved Coronary Bifurcations: Comparison of Three Drug-Eluting Stents, Annals of Biomedical Engineering, vol. 38(1):88-99 (Jan. 2010).
Nucifora, et al., Evaluation of the Left Atrial Appendage With Real-Time 3-Dimensional Transesophageal Echocardiography, Implications for Catheter-Based Left Atrial Appendage Closure, Circulation: Cardiovascular Imaging, 4(5):514-523 (Sep. 2011).
Rocatello et al., "Patient-Specific Computer Simulation to Elucidate the Role of Contact Pressure in the Development of New Conduction Abnormalities After Catheter-Based Implantation of a Self-Expanding Aortic Valve", Circulation Cardiovascular Interventions, 11(2):e005344 (Feb. 2018).
Russ, et al., Simulation of Transcatheter Aortic Valve Implantation Under Consideration of Leaflet Calcification, 35th Annual International Conference of the IEEE Engineering in Medicine and Biology Society (EMBC), pp. 711-714 (Jul. 2013).
Schneider, et al., Modeling Mitral Valve Leaflets from Three-Dimensional Ultrasound, International Conference on Functional Imaging and Modeling of the Heart, pp. 215-222 (May 2011).
Sirois, et al., *Hemodynamic Impact of Transcatheter Aortic Valve Deployment Configuration*, Journal of Medical Devices, 7(4):040922.1-040922.2 (Dec. 2013).
Steinberg, Cardiac Conduction System Disease After Transcatheter Aortic Valve Replacement, American Heart Journal, 164(5):664-671 (Nov. 2012).
Sun, et al., Simulated Elliptical Bioprosthetic Valve Deformation: Implications for Asymmetric Transcatheter Valve Deployment, Journal of Biomechanics, 43(16):3085-3090 (Dec. 2010).
Viscardi, et al., Comparative Finite Element Model Analysis of Ascending Aortic Flow in Bicuspid and Tricuspid Aortic Valve, Artificial Organs, 34(12):1114-1120 (Dec. 2010).
Vy, et al., Review of Patient-Specific Simulations of Transcatheter Aortic Valve Implantation, International Journal of Advances in Engineering Sciences and Applied Mathematics, 8(1):2-4 (Mar. 2016).
Wang et al., "Patient-specific modeling of biomechanical interaction in transcatheter aortic valve deployment," Journal of Biomechanics, 45(11):1965-1971 (Jul. 2012).
Astudillo, et al., Automatic Detection of the Aortic Annula Plane and Coronary Ostia from Multidetector Computed Tomography, Journal of Interventional Cardiology, vol. 2020, Article ID 9843275, 9 pages.
International Search Report & Written Opinion dated Feb. 21, 2023 in Int'l PCT Patent Appl. Serial No. PCT/EP2022/0784256 (0610).
International Search Report & Written Opinion dated Apr. 18, 2023 in Int'l PCT Patent Appl. No. PCT/EP2023/053366 (091001).

\* cited by examiner

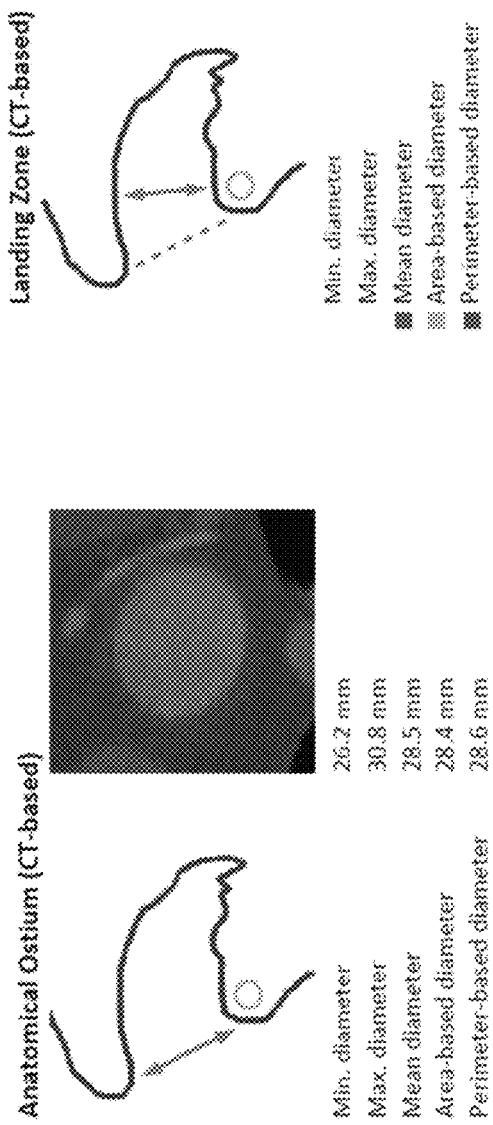
FIG. 11C
FIG. 11D
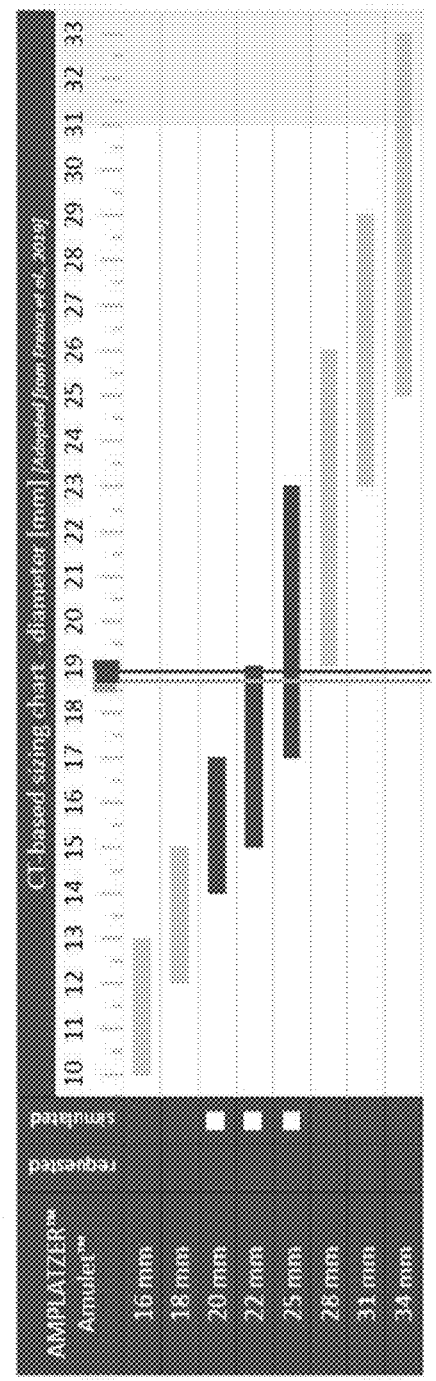
FIG. 11E

AMPLATZER™ Amulet™ 20 mm - distal
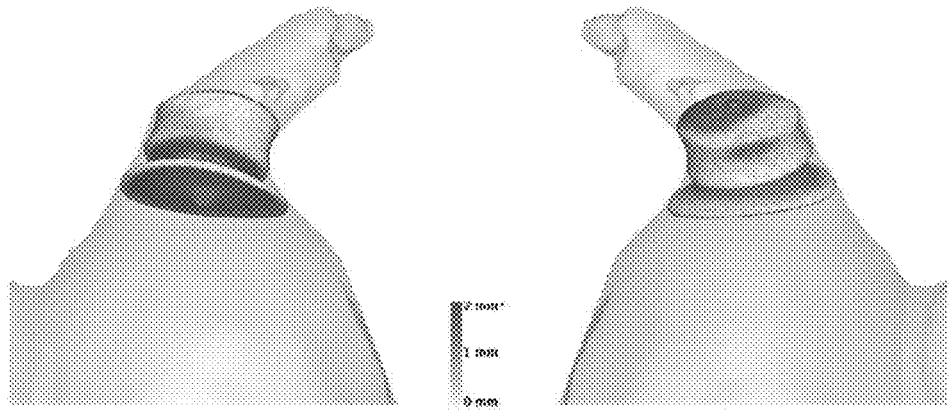
FIG. 11F
AMPLATZER™ Amulet™ 22 mm - proximal
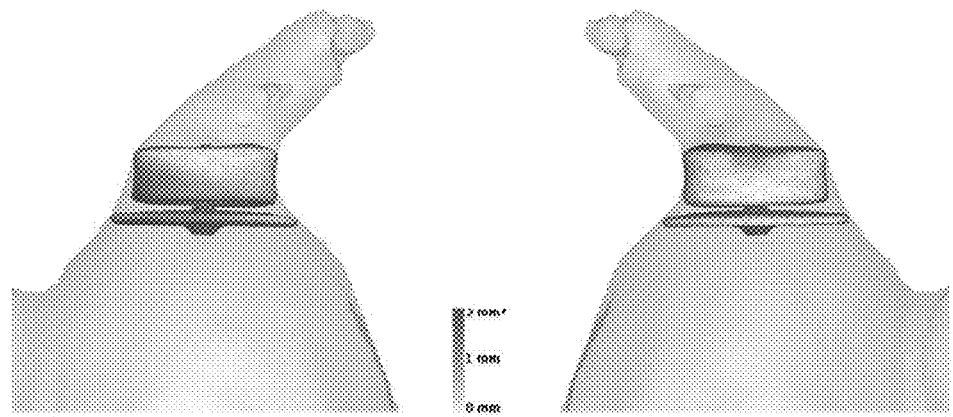
FIG. 11G
Simulation Results Summary
| AMPLATZER™ Amulet™ | Lobe cross-section | | | |
|---|---|---|---|---|
| | Area-based diameter [mm] | Perimeter-based diameter [mm] | Minimum diameter [mm] | Maximum diameter [mm] |
| 20 mm distal | 17.6 | 17.7 | 17.6 | 17.9 |
| 22 mm proximal | 21.0 | 21.1 | 21.0 | 21.2 |
| 22 mm distal | 18.9 | 18.9 | 18.7 | 19.1 |
| 25 mm proximal | 20.8 | 20.8 | 20.7 | 21.0 |
FIG. 11H

Sino-tubular Junction

| | |
|---|---|
| Area | 451.3 mm² |
| Perimeter | 76.3 mm |
| Min. diameter | 21.8 mm |
| Max. diameter | 25.5 mm |
| Mean diameter | 23.6 mm |
| Area-based diameter | 24.0 mm |
| Perimeter-based diameter | 24.3 mm |

Sinus of Valsalva

| | |
|---|---|
| Left | 28.2 mm |
| Right | 29.1 mm |
| Non | 31.1 mm |
| Average | 29.5 mm |

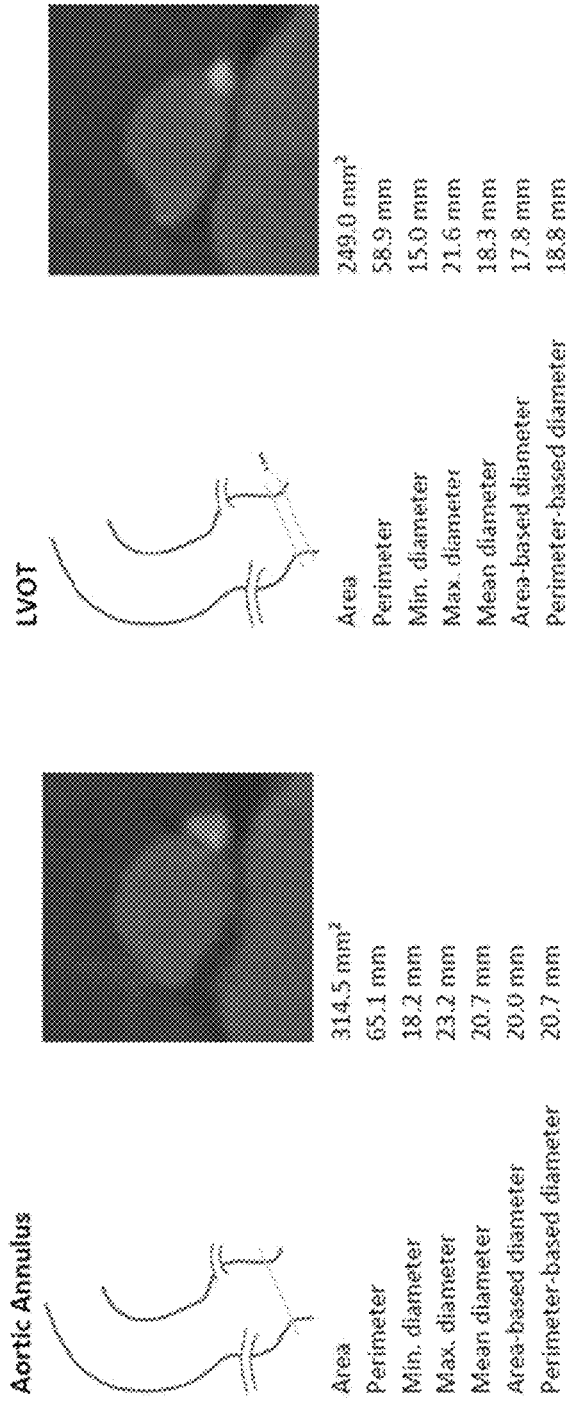
FIG. 13C
FIG. 13D
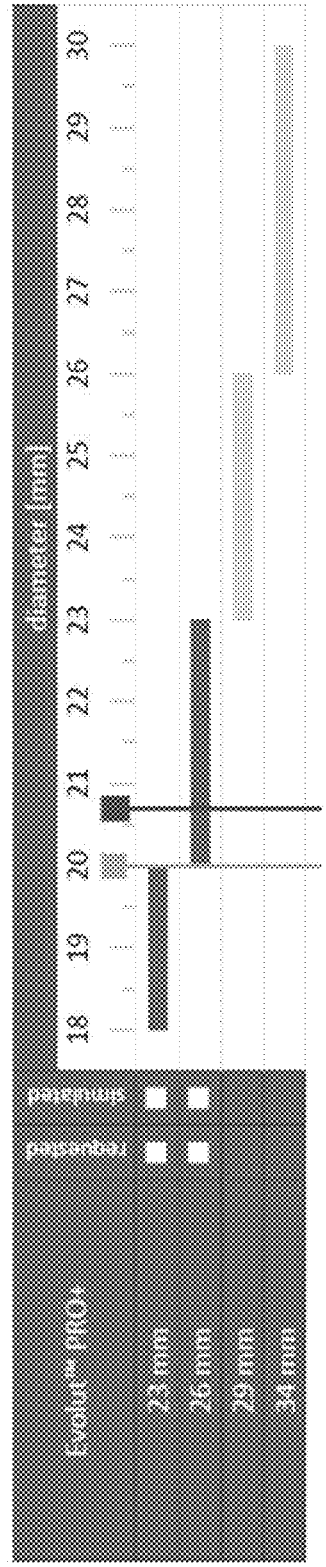
FIG. 13E

Left Coronary Distance

Distance Left Coronary
Ostium-Annular Plane     14.0 mm

Right Coronary Distance

Distance Right Coronary
Ostium-Annular Plane     15.6 mm

Sino-tubular Junction Distance

Minimum Distance
STJ-Annular Plane     17.4 mm

Aortic Arch Angulation

Angle     45.5°

Membranous Septum Length

Membranous Septum Length    2.4 mm

Processed Phase    n.a.
Valve Morphology    TAV
Grade of Calcium    MODERATE

US 12,471,997 B2

SYSTEMS AND METHODS FOR AUTOMATICALLY DETECTING ANATOMICAL FEATURES FOR PREOPERATIVE CARDIAC IMPLANT SIMULATIONS

CROSS-REFERENCE TO RELATED APPLICATIONS

This application claims priority to U.S. Provisional Patent App. Nos. 63/265,557, filed Dec. 16, 2021, and 63/255,900, filed Oct. 14, 2021, the entire contents of each of which are incorporated herein by reference.

FIELD OF USE

The present invention is directed to automated analysis of medical images, for example, for pre-operative planning of transcatheter structural heart interventions.

BACKGROUND

There has been an exponential growth in the number of structural heart interventions, largely driven by the widespread adoption of transcatheter aortic valve replacement (TAVR). A continued growth can be expected due to a further expansion of TAVR in combination with significantly increasing volumes for several other interventions, such as left atrial appendage occlusion (LAAO) and transcatheter mitral valve repair and replacement (TMVR).

Medical imaging is of utmost importance for all these structural heart interventions, from pre-procedural planning to intra-procedural guidance and post-procedural follow-up. A wide variety of imaging modalities can be used during these different stages. Notably, many centers rely on multi-slice computed tomography (MSCT) for pre-procedural planning. Driven by the enormous growth in structural heart interventions, there has been a steep increase in the number of MSCT analyses that need to be performed.

An MSCT analysis for planning structural heart interventions, whether TAVR, LAAO, or any other procedure, typically requires identifying certain anatomical landmarks and deriving measurements from these landmarks, in order to assess the procedural risks and to guide device selection and sizing. In addition, a segmentation or 3D volume reconstruction of certain anatomical structures is sometimes performed to better understand the patient's anatomy. Given that the currently available software solutions only provide semi-automated workflows, further automation is required. This may not only help to save a considerable amount of time but can also result in more standardization and a shorter learning curve for a starting operator.

In view of the foregoing drawbacks of previously known systems and methods, there exists a need for an automated anatomical analysis platform for preoperative planning.

SUMMARY

Systems and methods are provided herein to overcome the drawbacks of previously-known technologies. For example, automated anatomical analysis of an anatomical structure to facilitate pre-operative planning is provided. The systems and methods may be particularly well-suited for pre-operative planning associated with structural heart interventions, including transcatheter heart valve interventions such as transcatheter aortic valve repair and replacement (TAVR), transcatheter mitral valve repair and replacement (TMVR), and/or transcatheter left atrial appendage occlusion (LAAO) interventions.

In accordance with one aspect, a computerized method for automated anatomical analysis of an anatomical structure is provided. The computerized method may include obtaining a plurality of images, e.g., multi-slice computed tomography (MSCT) images, of patient-specific cardiovascular anatomy; analyzing the plurality of images with a trained artificial intelligence module to identify one or more anatomical landmarks and to construct a virtual three-dimensional model of the anatomical structure; deriving anatomical measurements of the one or more identified anatomical landmarks; and/or displaying the virtual three-dimensional model alongside the anatomical measurements of the one or more identified anatomical landmarks. The computerized method further may include pre-processing the plurality of MSCT images by resampling a volume of the multi-slice computed tomography images to an isotropic resolution and voxel size.

The anatomical structure may be the patient's left atrium and/or left atrial appendage, for example, for automation associated with left atrial appendage occlusion (LAAO) interventions. Accordingly, the one or more anatomical landmarks may be an ostium and a predetermined landing zone within the anatomical structure for a cardiac implantable device. Moreover, deriving anatomical measurements of the one or more identified anatomical landmarks may include identifying 3D planes defining the ostium and the predetermined landing zone, and performing measurements in the 3D planes. Additionally, deriving anatomical measurements of the one or more identified anatomical landmarks may include measuring a depth of the left atrial appendage. In addition, the one or more anatomical landmarks further may include a fossa ovalis, such that the fossa ovalis is identified as a 3D curve on an interatrial septum via the trained artificial intelligence module. The computerized method further may include planning a transseptal puncture site based on the identified fossa ovalis. The one or more anatomical landmarks further may include a mitral valve annulus.

The anatomical structure may be an aortic root, for example, for automation associated with transcatheter aortic valve repair and replacement (TAVR). Accordingly, the one or more anatomical landmarks may include an aortic annulus, a left ventricular outflow tract, a sino-tubular junction, or a sinus of Valsalva. Moreover, deriving anatomical measurements of the one or more identified anatomical landmarks may include measuring at least one of left coronary distance, right coronary distance, sino-tubular junction distance, aortic arch angulation, or membranous septum length.

In addition, analyzing the plurality of images with the trained artificial intelligence module to identify one or more anatomical landmarks may include executing at least one deep learning module selected from a list consisting of: segmentation, point detection, curve detection, and plane detection. For example, executing the segmentation deep learning module may include generating a probability mask indicative of a probability that each voxel of a plurality of voxels of the plurality of images is a predetermined label; assigning the predetermined label to each voxel of the plurality of voxels if the probability exceeds a predetermined threshold; and generating a segmentation mask comprising each voxel of the plurality of voxels assigned the predetermined label. Assigning the predetermined label to each voxel of the plurality of voxels if the probability exceeds the predetermined threshold may include binarizing the probability mask for a predefined class such that each voxel with a probability below the predetermined threshold is set to label zero and each voxel with a probability above the predetermined threshold is set to label one. Accordingly, the generated segmentation mask may include each voxel having label one. Additionally, the computerized method further may include combining the segmentation mask with one or more segmentation masks obtained using an image analysis technique, e.g., flooding.

Moreover, executing the point detection deep learning module may include generating a probability mask indicative of a probability that each voxel of a plurality of voxels of the plurality of images is a predetermined label defined by a predefined spherical region around a predefined point; assigning the predetermined label to each voxel if the probability exceeds a predetermined threshold; and obtaining a 3D point by taking a centroid of all voxels having the predetermined label to identify the one or more anatomical landmarks. The one or more anatomical landmarks may be identified based on cropping the plurality of images around the 3D point.

In addition, executing the curve detection deep learning module may include generating a probability mask indicative of a probability that each voxel of a plurality of voxels of the plurality of images is a predetermined label defined by a curve formed by sweeping a sphere having a predetermined radius along the curve for one of the one or more anatomical landmarks; assigning the predetermined label to each voxel if the probability exceeds a predetermined threshold; and identifying a 3D curve by using a graph-based technique on all voxels having the predetermined label. Executing the plane detection deep learning module may include assigning each voxel of a plurality of voxels of the plurality of images one of two or more predetermined labels; and extracting a connecting boundary between each voxel based on the assigned predetermined labels of each voxel using an image processing technique to fit a plane. Accordingly, deriving anatomical measurements of the one or more identified anatomical landmarks may include deriving a closed curve indicative of a boundary of the anatomical structure in the plane to calculate at least one of area-based, perimeter-based, minimum, and maximum diameters of the one or more identified anatomical landmarks.

In some embodiments, deriving anatomical measurements of the one or more identified anatomical landmarks may include deriving anatomical measurements of the one or more identified anatomical landmarks from the virtual three-dimensional model of the anatomical structure. The computerized method further may include displaying the identified anatomical landmarks overlaid on the virtual three-dimensional model of the anatomical structure. In addition, the computerized method further may include receiving user input feedback based on the displayed virtual three-dimensional model; and adjusting the anatomical measurements based on the user input feedback.

The computerized method further may include obtaining specifications of a plurality of cardiac implantable devices associated with the anatomical structure; and displaying information indicative of the specifications of the plurality of cardiac implantable devices alongside the anatomical measurements of the one or more identified anatomical landmarks to facilitate selection of a cardiac implantable device implant by a user. Moreover, the computerized method may include obtaining a virtual model of the selected cardiac implantable device; and virtually implanting the virtual model in a virtual three-dimensional model of the anatomical structure.

In accordance with another aspect of the present disclosure, a system for automated anatomical analysis of an anatomical structure is provided. The system may include a non-transitory computer readable medium programmed with instructions that, when executed by a processor of a computer, cause the computer to: obtain a plurality of images of patient-specific cardiovascular anatomy; analyze the plurality of images with a trained artificial intelligence module to identify one or more anatomical landmarks and to construct a virtual three-dimensional model of the anatomical structure; derive anatomical measurements of the one or more identified anatomical landmarks; and/or display the virtual three-dimensional model alongside the anatomical measurements of the one or more identified anatomical landmarks.

In accordance with another aspect of the present disclosure, a computer program product comprising code portions with instructions or a non-transitory computer readable medium programmed with instructions is provided. The instructions, when executed by a processor of a computer, cause the computer to: obtain a plurality of images of patient-specific cardiovascular anatomy; analyze the plurality of images with a trained artificial intelligence module to identify one or more anatomical landmarks and to construct a virtual three-dimensional model of the anatomical structure; derive anatomical measurements of the one or more identified anatomical landmarks; and display the virtual three-dimensional model alongside the anatomical measurements of the one or more identified anatomical landmarks.

It will be appreciated that any of the aspects, features, options and embodiments described herein can be combined. It will particularly be appreciated that any of the aspects, features and options described in view of the method apply equally to the system and computer program product, and vice versa.

BRIEF DESCRIPTION OF THE DRAWINGS

FIGS. 11A to 11D illustrate various measurements of a left atrial appendage.

FIG. 11E illustrates an exemplary implantable device sizing chart for left atrial appendage occlusion constructed in accordance with some aspects of the present invention.

FIGS. 11F and 11G illustrate virtual simulations of various implantable devices within 3D model reconstructions in accordance with some aspects of the present invention.

FIG. 11H illustrates an exemplary implantable device simulation results chart for left atrial appendage occlusion.

FIGS. 13A to 13D illustrate various measurements of an aortic root.

FIG. 13E illustrates an exemplary implantable device sizing chart for transcatheter aortic valve implantation.

DETAILED DESCRIPTION

Figure 1:
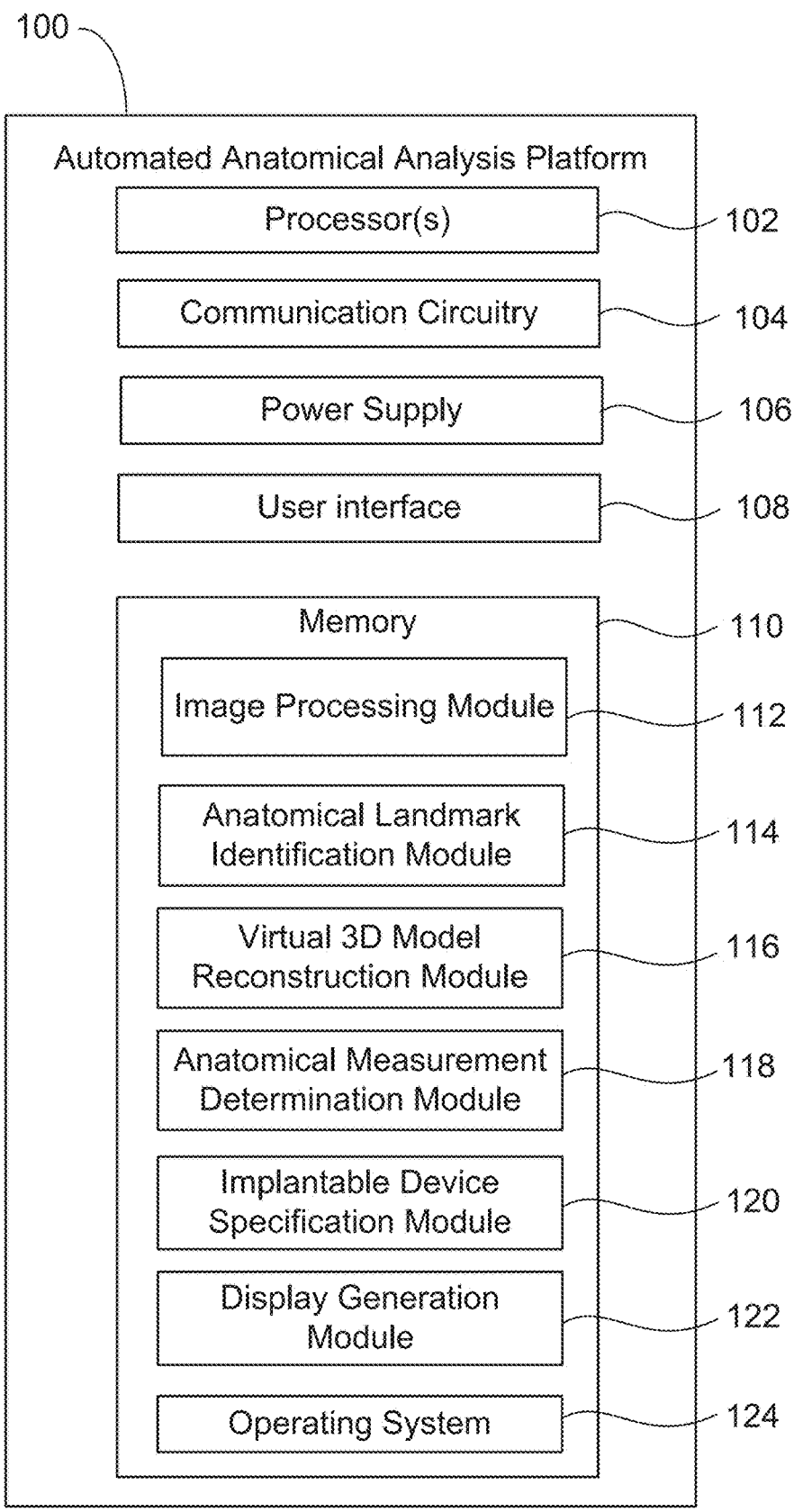
FIG. 1 shows some example components that may be included in an automated anatomical analysis platform in accordance with the principles of the present invention.

With the recent advances in artificial intelligence (AI), it has become possible to automate various tasks for preoperative planning including, for example, anatomical landmark identification, 3D model reconstruction, and anatomical landmark measurements derivation. Referring to FIG. 1, components that may be included in automated anatomical analysis platform 100 are described. Platform 100 may include one or more processors 102, communication circuitry 104, power supply 106, user interface 108, and/or memory 110. One or more electrical components and/or circuits may perform some of or all the roles of the various components described herein. Although described separately, it is to be appreciated that electrical components need not be separate structural elements. For example, platform 100 and communication circuitry 104 may be embodied in a single chip. In addition, while platform 100 is described as having memory 110, a memory chip(s) may be separately provided.

Platform 100 may contain memory and/or be coupled, via one or more buses, to read information from, or write information to, memory. Memory 110 may include processor cache, including a multi-level hierarchical cache in which different levels have different capacities and access speeds. The memory may also include random access memory (RAM), other volatile storage devices, or non-volatile storage devices. Memory 110 may be RAM, ROM, Flash, other volatile storage devices or non-volatile storage devices, or other known memory, or some combination thereof, and preferably includes storage in which data may be selectively saved. For example, the storage devices can include, for example, hard drives, optical discs, flash memory, and Zip drives. Programmable instructions may be stored on memory 110 to execute algorithms for identifying anatomical landmarks in medical images, e.g., MSCT, generating virtual 3D models of anatomical structures, and deriving measurements of the identified anatomical landmarks and structures.

Platform 100 may incorporate processor 102, which may consist of one or more processors and may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. Platform 100 also may be implemented as a combination of computing devices, e.g., a combination of a DSP and a microprocessor, a plurality of microprocessors, one or more microprocessors in conjunction with a DSP core, or any other such configuration.

Platform 100, in conjunction with firmware/software stored in the memory may execute an operating system (e.g., operating system 124), such as, for example, Windows, Mac OS, Unix or Solaris 5.10. Platform 100 also executes software applications stored in the memory. For example, the software may include, Unix Korn shell scripts, and/or may be programs in any suitable programming language known to those skilled in the art, including, for example, C++, PHP, or Java.

Communication circuitry 104 may include circuitry that allows platform 100 to communicate with an image capture device and/or other computing devices for receiving image files, e.g., MSCT. Additionally or alternatively, image files may be directly uploaded to platform 100. Communication circuitry 104 may be configured for wired and/or wireless communication over a network such as the Internet, a telephone network, a Bluetooth network, and/or a WiFi network using techniques known in the art. Communication circuitry 104 may be a communication chip known in the art such as a Bluetooth chip and/or a WiFi chip. Communication circuitry 104 permits platform 100 to transfer information, such as 3D model reconstructions and measurements, locally and/or to a remote location such as a server.

Power supply 106 may supply alternating current or direct current. In direct current embodiments, power supply may include a suitable battery such as a replaceable battery or rechargeable battery and apparatus may include circuitry for charging the rechargeable battery, and a detachable power cord. Power supply 106 may be charged by a charger via an inductive coil within the charger and inductive coil. Alternatively, power supply 106 may be a port to allow platform 100 to be plugged into a conventional wall socket, e.g., via a cord with an AC to DC power converter and/or a USB port, for powering components within platform 100.

User interface 108 may be used to receive inputs from, and/or provide outputs to, a user. For example, user interface 108 may include a touchscreen, display, switches, dials, lights, etc. Accordingly, user interface 108 may display information such as 3D model reconstructions, measurements, implantable device sizing charts, and/or simulations, to facilitate implantable device selection and preoperative planning by the user, as described in further detail below. Moreover, user interface 108 may receive user input, e.g., selection of an implantable device based on the displayed information, to thereby generate virtual simulations, as well as feedback from the user based on the displayed information, e.g., corrected measurements, such that platform 100 may adjust the information accordingly. In some embodiments, user interface 108 is not present on platform 100, but is instead provided on a remote, external computing device communicatively connected to platform 100 via communication circuitry 104.

Memory 110, which is one example of a non-transitory computer-readable medium, may be used to store operating system (OS) 124, image processing module 112, anatomical landmark identification module 114, virtual 3D model reconstruction module 116, anatomical measurement determination module 118, implantable device specification module 120, and display generation module 122. The modules are provided in the form of computer-executable instructions that may be executed by processor 102 for performing various operations in accordance with the disclosure.

Figure 2A:
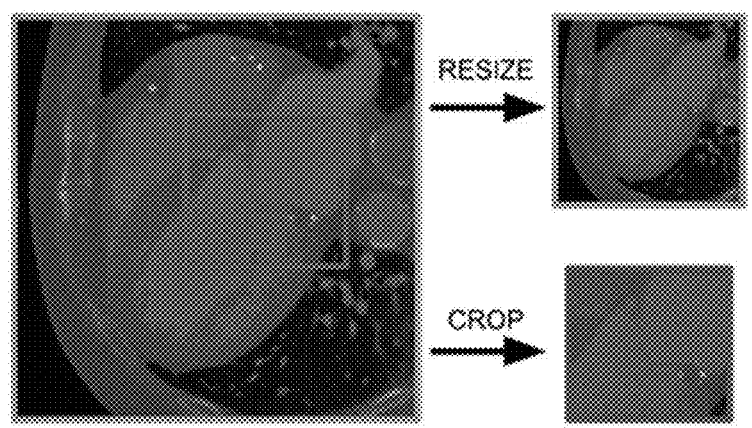
FIG. 2A illustrates examples of resizing and cropping of isotropic multi-slice computed tomography volumes.

Image processing module 112 may be executed by processor 102 for receiving and processing image files, e.g., MSCT. For example, image processing module 112 may pre-process the MSCT data by resampling the MSCT volume to an isotropic resolution and voxel size, which will have different values depending on the specific application, e.g., deep learning module. Once the MSCT volumes are isotropic, they may be resized or cropped to an input shape depending on the specific application. The difference between resizing and cropping is illustrated in FIG. 2A. For example, resizing keeps the entire data but in a smaller format; whereas, cropping takes out a region of interest without any resizing.

Figure 2B:
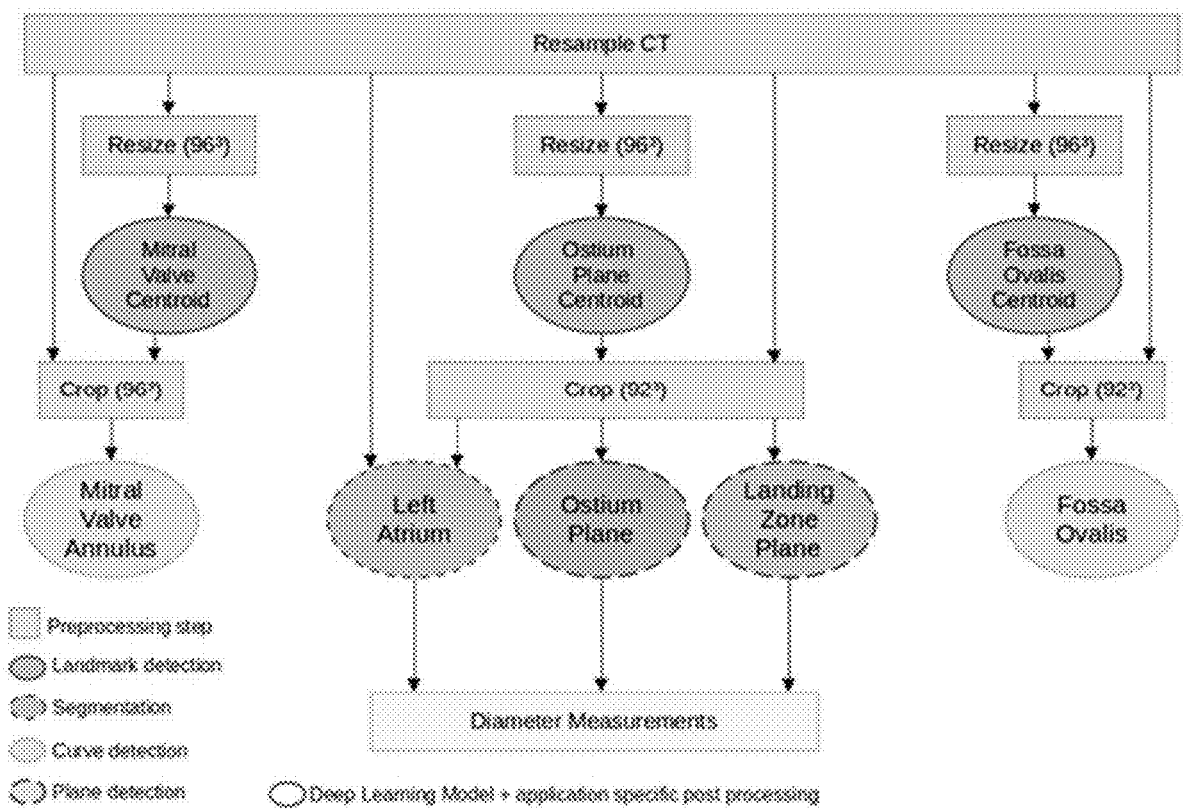
FIG. 2B illustrates a work flow in accordance with some aspects of the present invention.

Anatomical landmark identification module 114 may be executed by processor 102 for automatically identifying one or more anatomical landmarks in the MSCT data. For example, anatomical landmark identification module 114 may execute four distinct application types, e.g., deep learning modules, independently or in combination, to provide the required output for the anatomical analysis: segmentation, point detection, curve detection and plane detection. FIG. 2B illustrates the complete data flow for LAAO, starting from the resampled MSCT data. The resolution of the resampled MSCT may depend on the specific application, e.g., deep learning module.

Figure 3A:
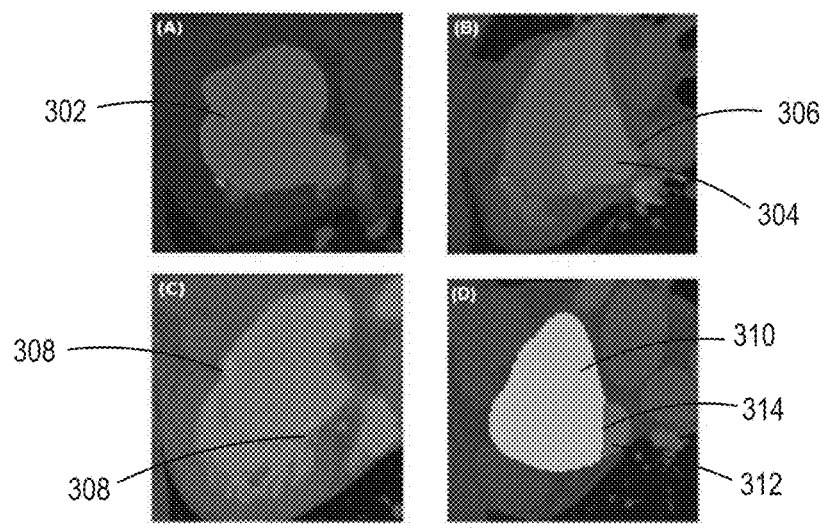
FIG. 3A illustrates various ground truth masks for training various deep learning modules in accordance with some aspects of the present invention.

Segmentation is the task of assigning a specific label to each part of the input, e.g., a 3D volume, to identify an anatomical structure and/or anatomical landmarks. Accordingly, the output of the segmentation deep learning module executed by anatomical landmark identification module 114 is a 3D volume of the same shape, with a label identifier assigned to each voxel inside the 3D volume. The segmentation deep learning module may be trained using manually obtained segmentation masks, which describe which voxels are part of the target anatomical feature, e.g., the left atrial appendage (LAA). An example of the manually obtained LAA segmentation mask 302 overlaid on the MSCT data is shown in the top left denoted (A) of FIG. 3A. Upon execution of the trained segmentation deep learning module by anatomical landmark identification module 114, a probability mask is returned, which describes the probability that a certain voxel belongs to the anatomical structure label, e.g., the LAA.

Post-processing of the output of the trained segmentation deep learning module is required to binarize the obtained probability mask. For example, given a predetermined threshold, all probabilities in the probability mask below the predetermined threshold are set to label zero, while all probabilities in the probability mask equal to or higher than the predetermined threshold are set to label one. Thus, the trained segmentation deep learning module generates a resulting segmentation mask that is comprised of the volume described by all the voxels with label one. To obtain a higher precision mask, the segmentation mask resulting from the trained segmentation deep learning module may be combined with segmentation masks obtained through image analysis techniques such as flooding.

Segmentation deep learning module may execute flooding algorithms to generate the segmentation mask. Flooding algorithms select and change values in an image based on their connectivity and similarity to a given seed point. The algorithms detect the area connected to a seed point and replace all the pixels with the same value by a target value. The bucket tool in paint is an example application of this algorithm. The flood fill algorithm is adapted to enable segmentation. All the connected pixels within certain tolerances from the seed point value are selected. Based on this selection a binary mask is created, instead of changing the values in the original image. A pseudocode of the flooding algorithm may include:

```
flood(ct_volume, pixel_index, seed_point, low_tolerance,
high_tolerance):
    value_at_seed_point = ct_volume[seed_point]
    accepted_range = [value_at_seed_point - low_tolerance,
        value_at_seed_point + high_tolerance]
    if ct_volume[pixel_index] in accepted_range:
        set the mask = 1 at this pixel_index
        for all neighbours of pixel_index:
            flood(ct_volume, neighbour, seed_point, low_tolerance,
            high_tolerance)
```

A small change may be done to the original function to obtain superior results. The possibility to use a different tolerance for the upper boundary and the lower boundary is added, which allows for more flexibility in the method. To determine these tolerances, the histogram of the 3D volume is used. The flood function takes as input the ct_volume, the seed_point and the tolerances tolerance_low and tolerance_high, and the output is a binary mask with the same shape as the ct_volume.

The values of the tolerances can be found using the function find_tolerances_from_image. This function takes as inputs the ct_volume, the seed_point, a smoothing_factor and a delta. A cube of size [2*delta]*3 is selected around the seed_point. The histogram is constructed based on this cube. If delta is None, the whole ct_volume is used. To decrease the influence of small peaks and/or valleys in the histogram, the values are smoothed with a median filter with a window size of (2*smoothing_factor)+1. This filter replaces every value in the histogram by the median of all the values within a distance of smoothing_factor.

Figure 3B:
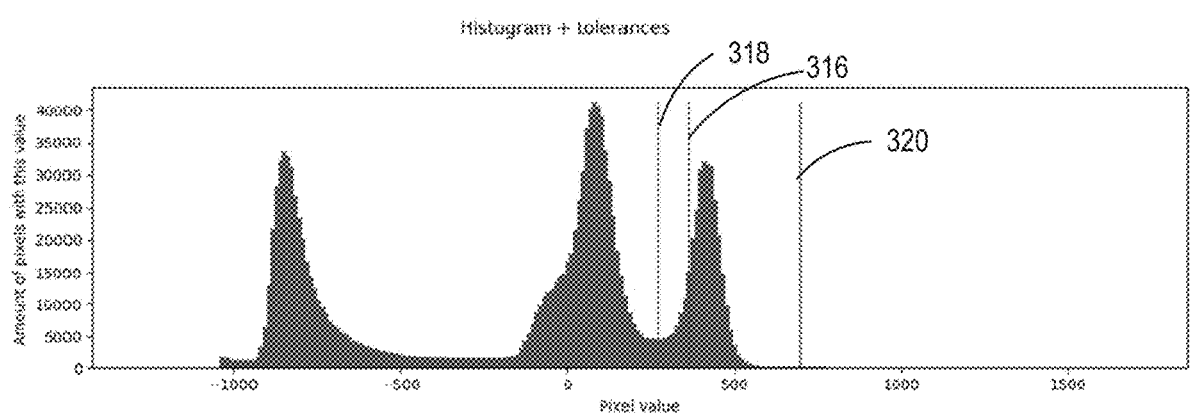
FIG. 3B illustrates the lower and upper boundaries of a histogram describing the Hounsfield unit values in accordance with some aspects of the present invention.

Once the histogram is constructed the tolerances are selected by detecting the valleys to the left and to the right of the value at the seed_point. FIG. 3B illustrates a histogram, where the value at the seed_point is represented by line 316, the lower boundary is represented by line 318, and the upper boundary is represented by line 320. The upper and lower boundaries thus detect one peak in the histogram which corresponds to a specific anatomical region in the image. The function returns tolerance_low (=value at the seed point—lower boundary) and tolerance_high (=upper boundary—value at the seed point). The function also allows the selection of the lower or higher tolerance based on the lowest or highest value in the histogram, respectively. In that case, all values lower or higher than the value at the seed point are selected respectively. The lower/upper boundary is then equal to the lowest/highest value in the cube cropped around the seed point if a delta is given. This may be useful when the desired region is the brightest or the darkest region in the image.

To superficially validate the output of the flooding algorithm, the ratio of ones and zeros in a cube around the seed point is calculated in the mask. If this value is too high or too low the tolerances may be adapted accordingly. The accepted range of this ratio depends on the specific application, e.g., specific anatomical structure being analyzed. This loop allows for a better generalization over different patients. Three possible scenarios are possible:

(1) The ratio can be within the accepted range. Then the loop is broken and the result is returned.

(2) The ratio can be too high. This means that the boundary between the anatomical region of interest and the background is not properly selected. This happens if too much irrelevant information is included in the histogram. Values of pixels that are not located in the region of interest or in the near vicinity of this region can fill up the valley between the desired region and it's direct neighbors. When this happens the value of delta is decreased and the histogram is constructed based on a smaller region around the seed point.

(3) The ratio can be too low. This means that only part of the anatomical region is selected. This can happen if a part of the region with slightly different pixel values is not included in the histogram. When this happens the delta is increased and the histogram is constructed based on a larger region around the seed point.

To avoid infinite looping, two checks are done. First, the delta can only be within certain boundaries to avoid that the delta goes to +/− infinity when the ratio remains too high or too low. Second, the deltas that are already tried are stored to avoid alternating between a lower and a higher value of deltas. This could occur when the ratio jumps from below to above the accepted region or vice versa.

A pseudocode of the complete flooding algorithm may include:

```
apply_flooding(ct_volume, seed_point, spacing, delta, delta_range,
    smoothing_factor, ratio_range):
    delta = delta / spacing
    delta_range = delta_range / spacing
    tolerance_low, tolerance_high =
    find_tolerances_from_image(ct_volume,
    seed_point, delta, smoothing_factor)
    flooded_mask = flood(ct_volume, seed_point,
    tolerance_low, tolerance_high)
    ratio = 100 * number of 1's in flooded_mask / size of flooded_mask
```

-continued

```
    while ratio not in ratio_range:
        if ratio is bigger than maximum of ratio_range:
            new_delta =delta − 10
        elif ratio is smaller than minimum of ratio_range:
            new_delta = delta + 10
        if new_delta is not used before and lies within delta_range:
            tolerance_low, tolerance_high =
            find_tolerances_from_image(ct_volume, seed_point,
            new_delta, smoothing_factor)
            flooded_mask = flood(ct_volume, seed_point, tolerance_low,
            tolerance_high)
        ratio = 100 * number of 1's in flooded_mask / size of flooded_mask
    return flooded_mask
```

Point detection is the task of obtaining a 3D point within the MSCT volume to identify specific regions of interest in the MSCT data for further processing, as described in further detail below. Alternatively, point detection may be used as a stand-alone, e.g., to detect the coronary ostia. The output of the point detection deep learning module executed by anatomical landmark identification module 114 is 3D point within the MSCT volume. The point detection deep learning module may be trained using manually obtained segmentation masks, which are generated by assigning a predetermined label to a region, e.g., a spherical region, around the location of a manually identified point. The radius of the sphere may be selected based on the anatomical structure to be analyzed. An example of the manually obtained LAA segmentation mask overlaid on the MSCT data, where region of interest 306 is annotated around centroid 304 of an anatomical ostium, is shown in the top right denoted (B) of FIG. 3A. Upon execution of the trained point detection deep learning module by anatomical landmark identification module 114, a probability mask is returned, which describes the probability that each voxel is a predetermined label, defined by a predefined spherical region around a predefined point.

Like the segmentation deep learning module, post-processing of the output of the trained point detection deep learning module is required to binarize the obtained probability mask. For example, given a predetermined threshold, all probabilities in the probability mask below the predetermined threshold are set to label zero, while all probabilities in the probability mask equal to or higher than the predetermined threshold are set to label one. Thus, the trained point detection deep learning module generates a resulting segmentation mask that is comprised of the volume described by one or more voxels with label one. To obtain a higher precision mask, the segmentation mask resulting from the trained point detection deep learning module may be combined with segmentation masks obtained through image analysis techniques such as flooding.

Next, the point detection deep learning module obtains a 3D point by taking a centroid of all voxels having the predetermined label, e.g., with label one, and identifies the specific region of interest of the anatomical structure (the anatomical landmark), e.g., by cropping the MSCT data around the centroid. For example, the detected centroid of the identified anatomical structure, e.g., a mitral valve, may be used to crop the MSCT data around the mitral valve to identify the anatomical landmark, e.g., the mitral valve annulus. The accuracy may depend on whether the input data is kept in full, but resized to a smaller cube (coarse grained point detection) or the input data is cropped around a specific point and fed to the point detection deep learning module without resizing (fine grained point detection).

Curve detection is the task of determining a 3D curve of an anatomical landmark. Accordingly, the output of the curve detection deep learning module executed by anatomical landmark identification module 114 is 3D curve within the MSCT volume. The curve detection deep learning module may be trained using manually obtained segmentation masks, which are generated by sweeping a sphere having a predetermined radius along manually identified curves, or along a series of manually identified points. The predetermined radius is selected based on the anatomical landmark, e.g., the fossa ovalis or the mitral valve annulus. The resulting segmentation masks may have a torus shape. An example of the manually obtained segmentation mask 308 overlaid on the MSCT data of a mitral valve annulus is shown in the bottom left denoted (C) of FIG. 3A. Upon execution of the trained curve detection deep learning module by anatomical landmark identification module 114, a probability mask is returned, which may be transformed to a 3D curve using graph-based techniques.

Plane detection is the task of determining a 3D plane of an anatomical landmark. Accordingly, the output of the plane detection deep learning module executed by anatomical landmark identification module 114 is 3D plane within the MSCT volume. Plane detection is fundamental to derive the diameter measurements of the anatomical landmarks, which may be used by physicians to understand the size thereof. The plane detection deep learning module may be trained using manually obtained segmentation masks, which are split into two regions by manually identified planes, e.g., the anatomical ostium or the landing zone. An example of the split manually obtained segmentation mask, e.g., region 310 and region 312 divided by plane 314, overlaid on the MSCT data is shown in the bottom right denoted (D) of FIG. 3A. Upon execution of the trained plane detection deep learning module by anatomical landmark identification module 114, a probability mask is returned, which assigns each voxel within the anatomical structure, e.g., the LAA, one of two predetermined labels.

Subsequently, the connecting boundary between the voxels annotated by these labels may be extracted using imaging processing techniques and used to fit a 3D plane through the points lying on the connecting boundary. For example, plane points may be used together with the probability mask to define 3 distinct classes: a background class and two foreground classes. The foreground classes are separated by the 3D plane. During post-processing, a 3D plane is extracted from the probability masks. After removing the background, the connecting boundary between the foreground classes is extracted using image processing techniques.

Figure 4:
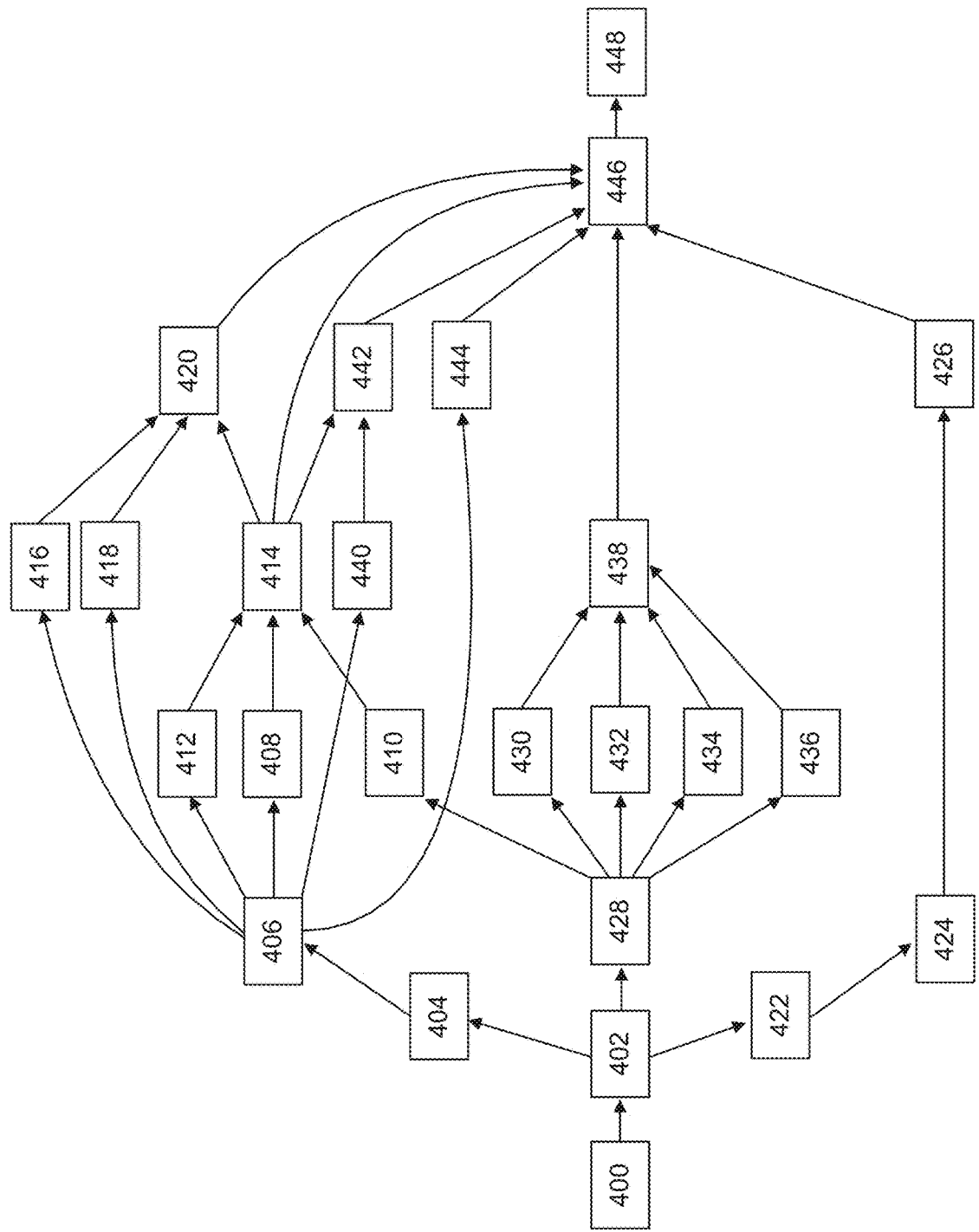
FIG. 4 illustrates a left atrial appendage occlusion work flow in accordance with some aspects of the present invention.

Accordingly, anatomical landmark identification module 114 may execute the segmentation deep learning module, point detection deep learning module, curve detection deep learning module, and plane detection deep learning module, independently or in combination, to provide the required output for the anatomical analysis. For example, anatomical landmark identification module 114 may be a cascading mechanism where the output of one module may be used to determine the input of a subsequent module. FIG. 4 illustrates an exemplary work flow executed by anatomical landmark identification module 114 for LAAO. All nodes in the work flow are executed as soon as possible, meaning if all dependency requirements are fulfilled, the next node is triggered.

The work flow begins at node 400, and at node 402 (perform_dicom_task), image processing module 112 performs DICOM tasks by processing the raw DICOM stack and converting it into a single file, usable by all other modules. If required, the data is resampled from DICOM resolution to an isotropic resolution of 0.5 or 1 mm.

Anatomical landmark identification module 114 then may automatically detect the ostium plane centroid (OPC) using the point detection deep learning module. For example, at node 404 (opc_detection_coarse), the input is the DICOM stack in resolution 1.0 mm, and the stack is resized to a cube shape of, e.g., 96×96×96, before entering the landmark detection deep learning model. For example, the landmark detection deep learning model may be any deep learning architecture such as Dense V-Net or SegResNet. The output of node 404 is a rough estimation of the OPC, e.g., coarse grained OPC. At node 406 (opc_detection_fine), the input is the DICOM stack in resolution 1.0 mm as well as the output of node 404. The stack is cropped around the coarse OPC to a cube shape, e.g., 64×64×64, before entering the landmark detection deep learning model. The output of node 406 is an accurate representation of the OPC, e.g., fine grained OPC. As will be understood by a person having ordinary skill in the art, different cube sizes other than 96×96×96 or 64×64×64 may be used.

Next, anatomical landmark identification module 114 may automatically segment the left atrium (LA) and left atrial appendage (LAA) using the segmentation deep learning module. For example, at node 408 (laa_segmentation_coarse), the input is the DICOM stack in resolution 1.0 mm as well as the output of node 406. The stack is cropped around the OPC to a shape of, e.g., 192×192×192, before entering the segmentation deep learning model. The output is a rough contour of the LAA, e.g., coarse grained LAA. At node 410 (laa_segmentation_fine), the input is the DICOM stack in resolution 0.5 mm as well as the output of node 428 (MVC detection described in further detail below). The stack is cropped around the MVC to a shape, e.g., 128×128×128 (so 64×64×64 mm), before entering the segmentation deep learning model. The output is an accurate representation of the LAA contour around the MVC area, e.g., fine grained LAA. As will be understood by a person having ordinary skill in the art, different cube sizes other than 192×192×192 or 128×128×128 may be used.

At node 412 (la_flooding), which is not a deep learning implementation, but rather an image analysis implementation, the fine grained OPC output from node 406 is used to apply flooding on the MSCT data in DICOM resolution using the flooding algorithms described above. The lower and upper tolerances of the algorithm are defined iteratively, allowing for a patient specific segmentation of the LAA.

At node 414 (laa_ensemble), the output of both coarse and fine grained LAA segmentation from nodes 408 and 410, respectively, as well as the LA flooding from node 412, are combined in accordance with the following steps: resample all masks back to original DICOM resolution; dilate the coarse grained deep learning LAA mask; multiply the dilated coarse grained deep learning mask with the LA flooding mask to cut off the LA flooding mask outside the region of interest, which results in a new flooding mask; multiply the fine grained LAA mask with the new flooding mask around the MVC to create a clean cutoff between the left atrium and left ventricle; and clean the mask to remove any loose parts. To remove any imperfections originating from the merging, this final binary mask may be multiplied with the original binary flooding mask. This is the same as applying an OR operation using both masks.

Next, anatomical landmark identification module 114 may automatically detect landing zone planes (LZP) for various implantable devices, e.g., Watchman FLX (made available by Boston Scientific, Marlborough, Massachusetts) and Amplatzer Amulet (made available by Abbott Laboratories, Chicago, Illinois), using the plane detection deep learning module. At each of node 416 (wtm_detection) for the Watchman FLX and node 418 (amu_detection) for the Amulet, the input is the DICOM stack in resolution 1.0 mm as well as the output of node 406. The stack is cropped around the OPC to a shape of, e.g., 92×92×92, before entering the landmark detection deep learning model. The output is a segmentation mask containing 3 or 4 classes: the background, the LAA on the left of the LZP (Class I), e.g., region 310 of FIG. 3A, and the LAA on the right of the LZP (Class II), e.g., region 312 of FIG. 3A, and optionally, the LZP region with a width of 2 mm.

Figure 5:
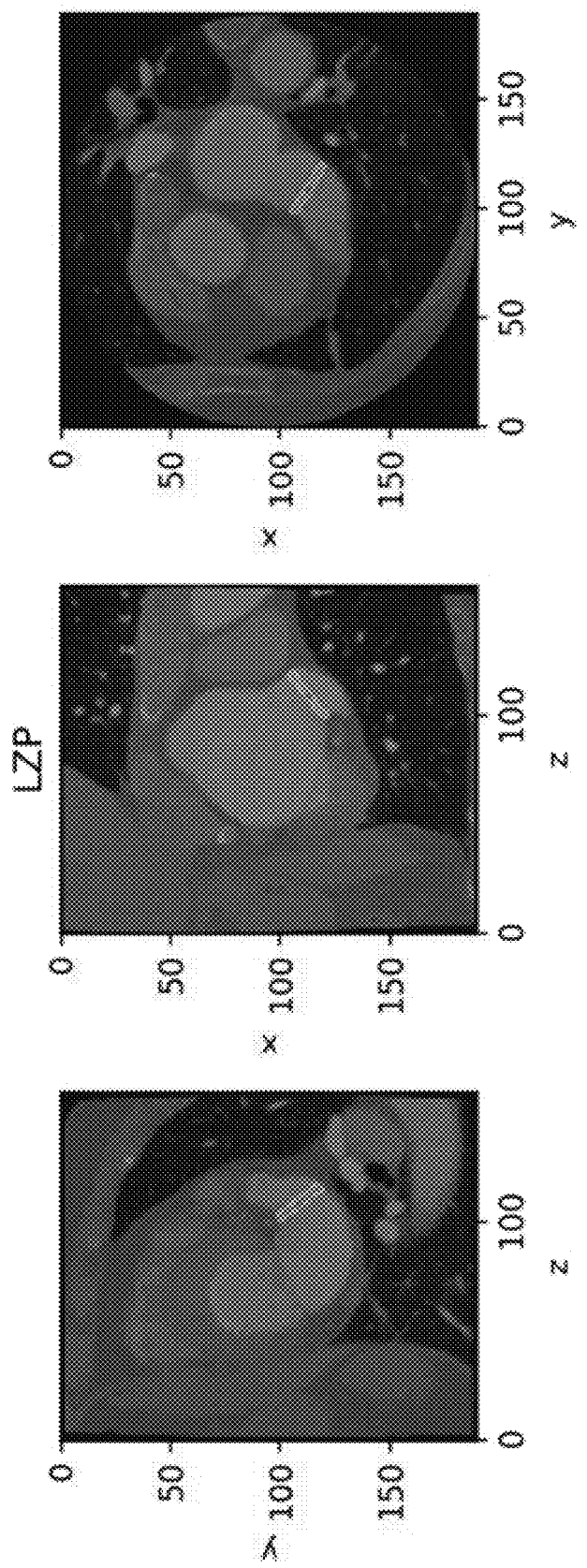
FIG. 5 illustrates an extracted landing zone plane of an anatomical structure in accordance with some aspects of the present invention.

At node 420 (lzp_curve_extraction), the LZP is extracted from the raw segmentation deep learning module output. It takes both Classes I and II, dilates the predictions, and extracts the overlap between them. Next, it applies a smoothing function and reconstructs a 3D plane from the combined and processed mask. FIG. 5 illustrates the extracted LZP using both Classes I and II. The same principles apply for nodes 416 and 418.

Referring again to FIG. 4, anatomical landmark identification module 114 may automatically detect the fossa ovalis centroid (FOC) using the point detection deep learning module. At node 422 (foc_detection_coarse), the input is the DICOM stack in resolution 1.0 mm. The stack is resized to a shape of, e.g., 96×96×96, before entering the landmark detection deep learning model. The output is a rough estimation of the FOC, e.g., coarse grained FOC. At node 424 (foc_detection_fine), the input is the DICOM stack in resolution 1.0 mm as well as the output node 422. The stack is cropped around the coarse grained FOC to a shape, e.g., 96×96×96, before entering the landmark detection deep learning model. The output is an accurate representation of the FOC, e.g., fine grained FOC.

Next, anatomical landmark identification module 114 may automatically detect the fossa ovalis curve (FOP) using the curve detection deep learning module. At node 426 (fop_detection), the input is the DICOM stack in resolution 1.0 mm as well as the output of node 424. The stack is cropped around the fine grained FOC to a shape, e.g., 92×92×92, before entering the landmark detection deep learning model. The output is a torus-like shape segmentation mask, representing the fossa ovalis. With the post processing by the curve detection deep learning module, the output is then converted into a closed polygon of 3D points.

Anatomical landmark identification module 114 further may automatically detect the mitral valve centroid (MVC) using the point detection deep learning module. At node 428 (mvc_detection), the input is the DICOM stack in resolution 1.0 mm. The stack is resized to a shape of, e.g., 96×96×96, before entering the landmark detection deep learning model. The output is a rough estimation of the MVC, e.g., coarse grained MVC. At each of nodes 430, 432, 434, 436, the input is the DICOM stack in resolution 1.0 mm as well as the output of node 428. The stack is cropped around the MVC to a shape, e.g., 96×96×96, before entering the landmark detection deep learning model. The output is a torus-like shape segmentation mask with different radii, e.g., 2 mm at node 430, 3 mm at node 432, 5 mm at node 434, and 7 mm at node 436, representing the mitral valve annulus. No post processing is performed in this step to keep the probabilities in the next node.

At node 438 (mva_ensemble), the outputs of nodes 430, 432, 434, and 436 are combined by averaging over the different predictions. The combined probabilities of the predictions are then thresholded similar to the post-processing by the segmentation deep learning module described above, e.g., binarize, and a 3D curve is extracted similar to the post-processing by the curve detection deep learning module described above.

Anatomical landmark identification module 114 further may automatically detect the ostium plane (OSP) using the plane detection deep learning module. At node 440 (osp_detection), the input is the DICOM stack in resolution 1.0 mm as well as the output of node 406. The stack is cropped around the OPC to a shape, e.g., 92×92×92, before entering the landmark detection deep learning model. The output is similar to the LZP nodes: a segmentation mask containing 3 classes: the background, the LAA on the left of the OSP (Class I) and the LAA on the right of the OSP (Class II). At node 442 (osp_curve_extraction), the OSP is extracted from the raw segmentation deep learning module output. It takes both Classes I and II, dilates the predictions, and extracts the overlap between them. Next, it applies a smoothing function and reconstructs a 3D plane from the combined and processed mask.

Anatomical landmark identification module 114 further may automatically detect the left circumflex artery (LCX) using the segmentation deep learning module. At node 444 (lcxsegmentation), the input is the DICOM stack in resolution 1.0 mm as well as the output of node 406. The stack is cropped around the fine grained OPC to a shape, e.g., 64×64×64, before entering the landmark detection deep learning model. The output is a segmentation mask describing the left circumflex artery contours.

At node 446 (check_delivered_files), anatomical landmark identification module 114 confirms whether all the required fields have been delivered to the requesting party. If so, the work flow is done at node 448.

Referring again to FIG. 1, virtual 3D model reconstruction module 116 may be executed by processor 102 for generating a 3D model reconstruction of the identified anatomical structure, including the identified anatomical landmarks, based on the output of anatomical landmark identification module 114 described above. Virtual 3D model reconstruction module 116 may generate the 3D model reconstruction by using computerized methods described in, for example, U.S. Pat. No. 10,789,722 to Mortier and U.S. Patent Appl. Pub. No. 2021/0022806 to De Beule, the entire contents of each of which are incorporated herein by reference.

Anatomical measurement determination module 118 may be executed by processor 102 for extracting additional output required for preoperative planning, e.g., based on the output of anatomical landmark identification module 114. Additionally or alternatively, anatomical measurement determination module 118 may extract measurements from the 3D model reconstruction generated by virtual 3D model reconstruction module 116. For example, for each of the detected planes, e.g., the anatomical ostium and landing zone, a closed curve describing the boundary of the LAA in the predicted planes is derived using the LAA segmentation, and four diameters may be calculated: area-based diameter, perimeter-based diameter, minimum diameter, and maximum diameter.

Depth measurements within the anatomical structure also may be derived depending on the anatomical structure being analyzed in the MSCT images. For example, for LAAO, measurements may include: LAA depth; LAA centerline, distance between the anatomical ostium and landing zone; area-based, perimeter-based, minimum, maximum, and diameters of the anatomical ostium and landing zone; etc.

The LAA depth, e.g., for Amulet devices, may be derived by calculating the distance between the centroid of the anatomical ostium plane and its projection to the LAA surface, e.g., at the roof of the LAA. With a similar procedure, the LAA depth, e.g., for Watchman FLX devices, may be derived by calculating the distance between the landing zone centroid and the LAA tip.

For TAVR, measurements may include: area-based, perimeter-based, minimum, maximum, and diameters of the sino-tubular junction, aortic annulus, and LVOT; sinus of Valsalva measurements; left coronary distance; right coronary distance; sino-tubular junction distance; aortic arch angulation; membranous septum length; vessel tortuosity; minimum diameter between access point and aortic root; calcification levels; etc. For TMVR, measurements may include: mitral valve annulus measurements; left ventricular volume; distance between mitral valve annulus and apex; aortomitral angulation; etc. For TPVR, measurements may include: pulmonary valve annulus measurements; right ventricular volume; etc. For TTVR, measurements may include: tricuspid valve annulus measurements; right atrial volume; right ventricular volume; etc.

Implantable device specification module 120 may be executed by processor 102 for accessing a database, e.g., stored in memory 110, having information regarding the measurement specifications of various implantable cardiac devices. Based on the anatomical measurements derived by anatomical measurement determination module 118, implantable device specification module 120 may generate an implantable device sizing chart with information for facilitating a physician's selection of an appropriate implantable device for a patient's specific anatomy. For example, the device sizing chart may include various sizes of a specific implantable device as well as their respective size range capabilities, alongside the patient's anatomical measurements, such that a physician may determine the appropriate size device based on the size range capability of the device and the size of the patient's anatomical landmark. In addition, implantable device specification module 120 may obtain a virtual model of the various implantable devices stored in the database for virtual simulation of the virtual implantable device within the 3D model reconstruction.

Display generation module 122 may be executed by processor 102 for causing a display, e.g., user interface 108 or an external computing device, to display the 3D model reconstruction of the anatomical structure to facilitate preoperative planning by a physician. For example, display generation module 122 may display the 3D model reconstruction overlaid with the identified anatomical landmarks in a manner easily identifiable by the user, e.g., in a different color format or with designated readable labels, as shown in the upper left denoted by (A) of FIG. 6. Display generation module 122 further may display the 3D model reconstruction alongside one or more of the anatomical measurements derived by anatomical measurement determination module 118.

Figure 6:
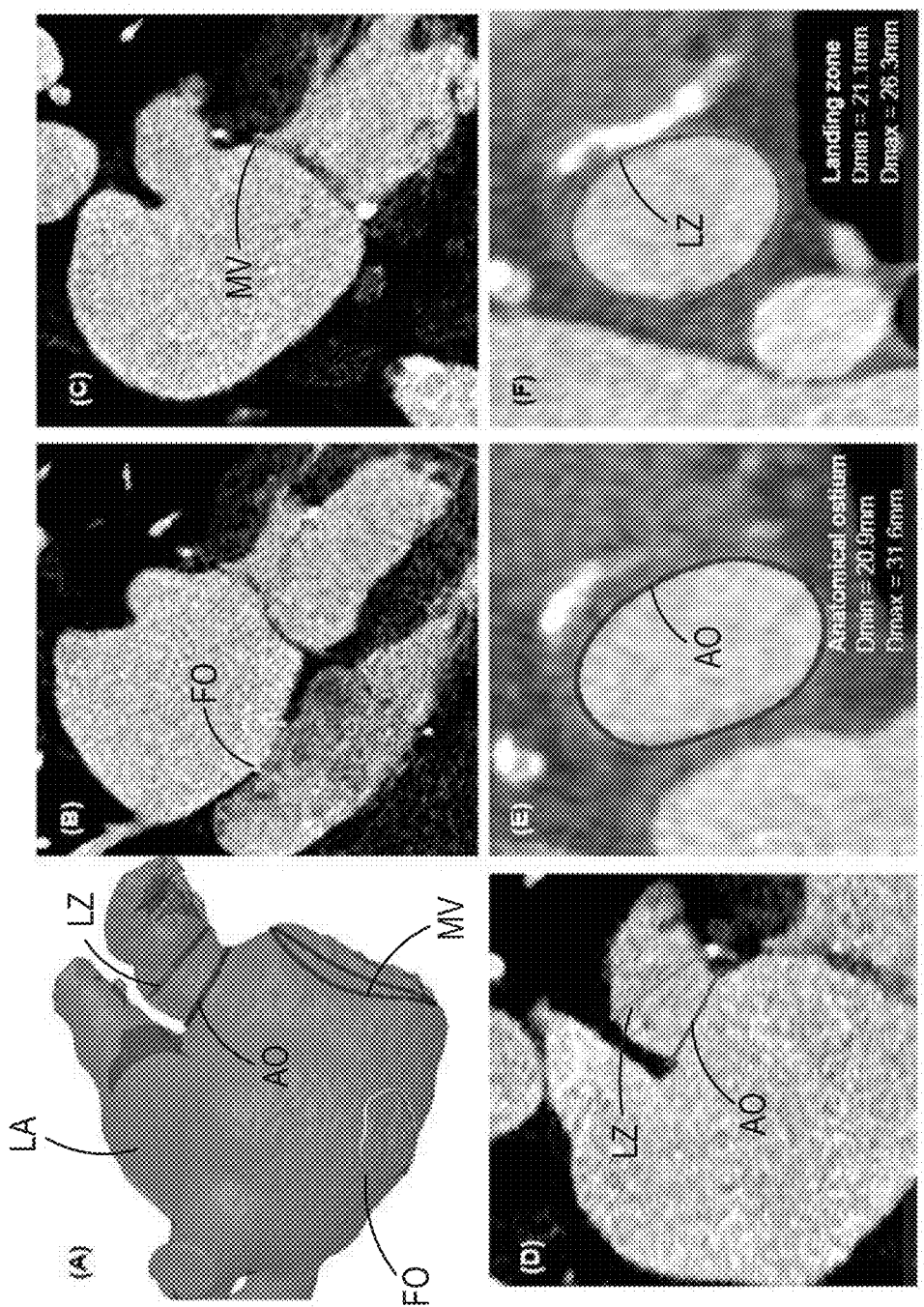
FIG. 6 illustrates anatomical structures and landmarks identified by an exemplary artificial intelligence module constructed in accordance with some aspects of the present invention.

Moreover, display generation module 122 may display the identified anatomical landmarks on the DICOM. For example, the upper middle denoted by (B) of FIG. 6 illustrates the identified fossa ovalis region on the DICOM, the upper right denoted by (C) of FIG. 6 illustrates the identified mitral valve annulus on the DICOM, the bottom left denoted by (D) of FIG. 6 illustrates the identified anatomical ostium and landing zone planes on the DICOM, the bottom middle denoted by (E) of FIG. 6 illustrates the identified anatomical ostium plane alongside its anatomical measurements, and the bottom right denoted by (F) of FIG. 6 illustrates the identified landing zone alongside its anatomical measurements.

Figure 7A:
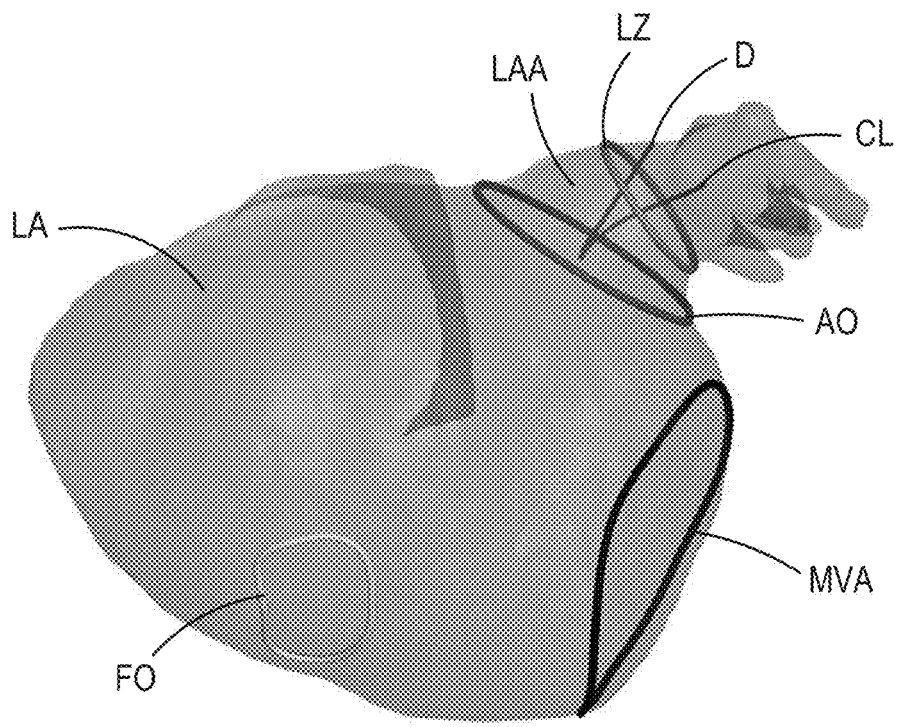
FIG. 7A illustrates an exemplary 3D model reconstruction of a left atrium and left atrial appendage overlaid with identified anatomical landmarks in accordance with some aspects of the present invention.
Figure 7B:
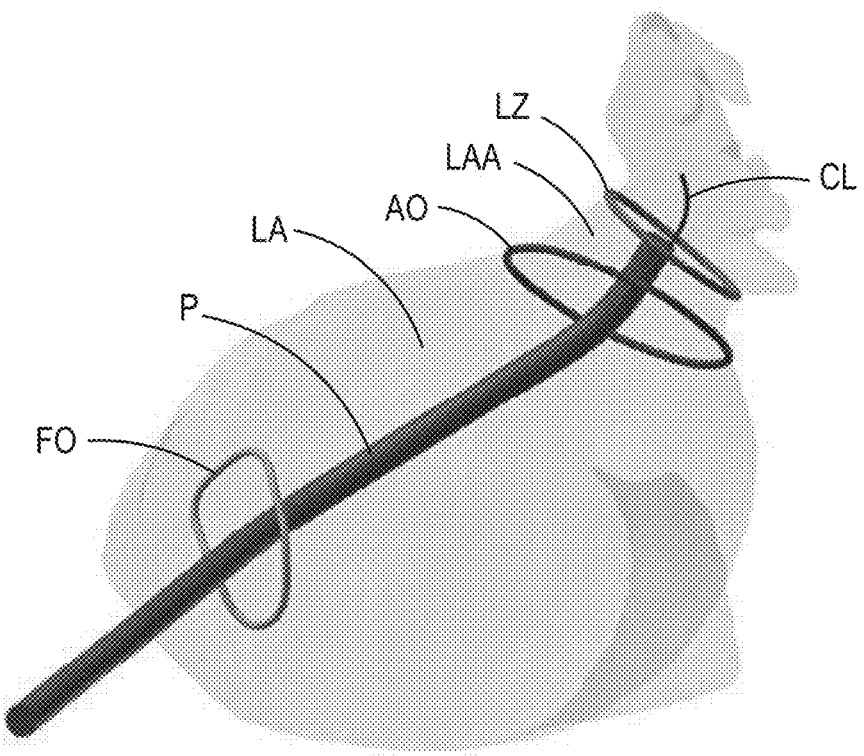
FIG. 7B illustrates planning a transseptal puncture site using an exemplary 3D model reconstruction in accordance with some aspects of the present invention.

As shown in FIG. 7A, the 3D model reconstruction of the anatomical structure, e.g., left atrium LA and left atrial appendage LAA, may be overlaid with the identified anatomical landmarks including, for example, fossa ovalis FO, mitral valve annulus MVA, anatomical ostium AO, landing zone LZ, centerline CL of the left atrial appendage, and depth D of the left atrial appendage. Based on the identified anatomical landmarks such as landing zone LZ, anatomical ostium AO, and fossa ovalis FO, transseptal puncture path P through fossa ovalis FO, anatomical ostium AO, and landing zone LZ along centerline CL may be selected by the physician as part of preoperative planning for LAAO, as shown in FIG. 7B.

Referring again to FIG. 1, display generation module 122 may display the implantable device sizing charts generated by implantable device specification module 120 to facilitate selection of an appropriate device by the physician. Accordingly, in some embodiments, upon selection of an implantable device based on the implantable device sizing chart by the user, e.g., via user interface 108, display generation module 122 may virtually display a virtual model of the selected implantable device within the 3D model reconstruction of the anatomical structure, as described in U.S. Pat. No. 10,789,722 and U.S. Patent Appl. Pub. No. 2021/0022806.

Moreover, one or more additional predictive modelling modules, e.g., trained artificial intelligence models or physics-based modelling such as finite element analysis, may be executed to measure the effects of the placement of the virtual implantable device model within the 3D model reconstruction of the anatomical structure on the device itself and/or on the anatomical structure and landmarks. For example, the predictive modelling modules may measure mechanical interactions between the virtual implantable device model and the anatomical structure and landmarks within the 3D model reconstruction, such that the risk of the patient developing cardiac conduction abnormalities may be determined as described in U.S. Pat. No. 11,141,220 to Mortier, the entire contents of which are incorporated herein by reference. Additionally, the predictive modelling modules may measure deformations of the anatomical structures and landmarks due to placement of the virtual implantable device model, such that the risk of hemodynamic compromise for the patient as a result of the intervention may be determined as described in U.S. Pat. No. 11,045,256 to Mortier, the entire contents of which are incorporated herein by reference.

Figure 8B:
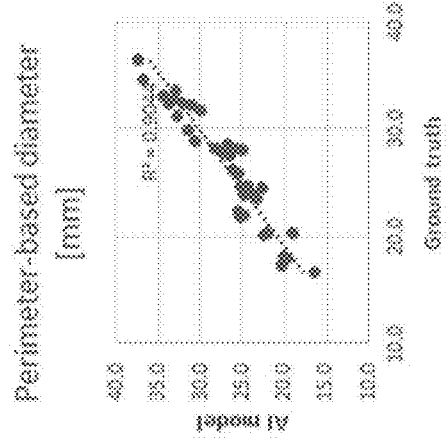
FIGS. 8B and 8C are graphs of perimeter-based diameters derived from the anatomical landmarks identified manually and via an exemplary artificial intelligence module for an anatomical ostium and a landing zone, respectively.
Figure 8C:
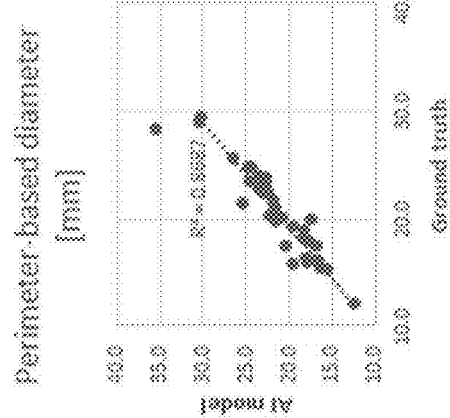
Figure 8A:
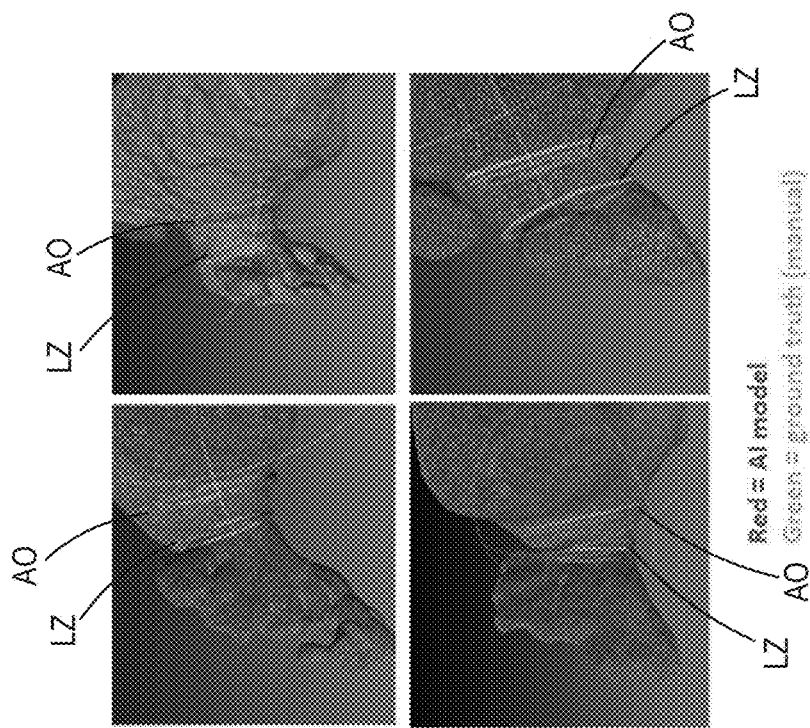
FIG. 8A illustrates a comparison between anatomical landmarks identified manually and via an exemplary artificial intelligence module.

Referring now to FIGS. 8A to 8C, anatomical landmarks, e.g., anatomical ostium AO and landing zone LZ, identified via anatomical landmark identification module 114 (AI model) are compared against the respective anatomical landmarks identified manually (ground truth). FIG. 8A displays the anatomical structure, e.g., left atrial appendage, overlaid with both anatomical ostium AO and landing zone LZ identified by the AI model and by the ground truth to illustrate the accuracy of anatomical landmark identification module 114. FIG. 8B is a graph illustrating perimeter-based diameters of anatomical ostium AO derived from the AI model against perimeter-based diameters of anatomical ostium AO derived from the ground truth. FIG. 8C is a graph illustrating perimeter-based diameters of landing zone LZ derived from the AI model against perimeter-based diameters of landing zone LZ derived from the ground truth.

Figure 9:
FIG. 9 illustrates a web-based Digital Imaging and Communications in Medicine (DICOM) platform constructed in accordance with some aspects of the present invention.

FIG. 9 illustrates a web-based Digital Imaging and Communications in Medicine (DICOM) platform, where users may see the results of the AI-based automated anatomical analysis. In addition, users may review the analysis to adjust some of the provided results, if needed, and to perform additional measurements.

Figure 10:
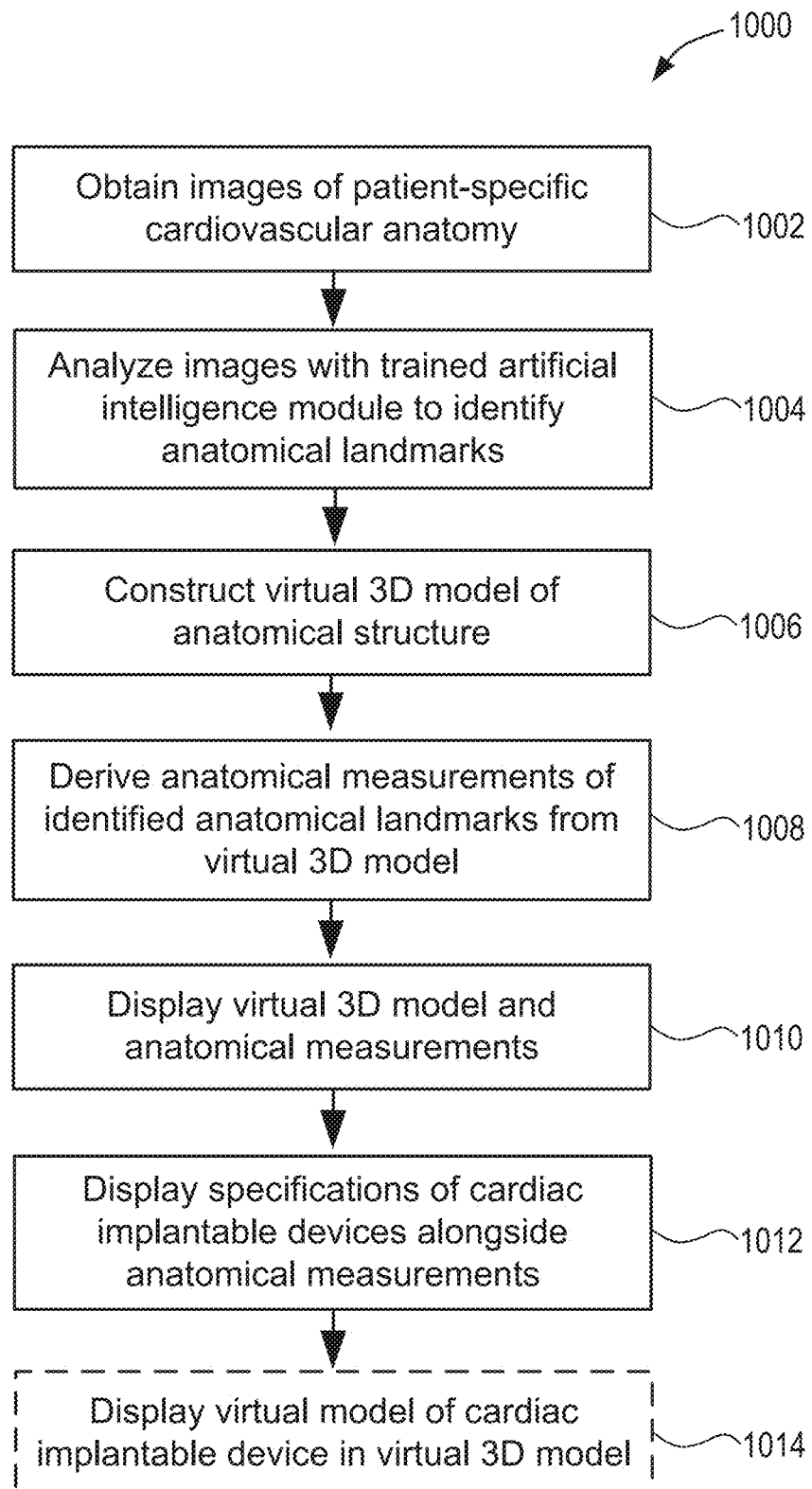
FIG. 10 is a flow chart illustrating the steps of performing automated anatomical analysis of an anatomical structure in accordance with some aspects of the present invention.

Referring now to FIG. 10, exemplary method 1000 for automated anatomical analysis using platform 100 is described. At step 1002, medical images, e.g., MSCT images, of a patient-specific cardiovascular anatomy are obtained, e.g., via image processing module 112. As described above, the obtained MSCT data may be preprocessed by resampling the MSCT volume to an isotropic resolution and voxel size, which will have different values depending on the specific deep learning module.

At step 1004, the MSCT images are automatically analyzed with a trained artificial intelligence module, e.g., anatomical landmark identification module 114, to segment the anatomical structure and to identify anatomical landmarks therein, e.g., fossa ovalis, mitral valve annulus, anatomical ostium, landing zone, etc., of the anatomical structure, e.g., left atrium and left atrial appendage, within the MSCT images. For example, anatomical landmark identification module 114 may execute any one of the segmentation, point detection, curve detection, or plane detection deep learning modules, independently or in combination sequentially or simultaneously, to identify the one or more anatomical landmarks, and to generate data corresponding thereto.

At step 1006, a virtual 3D model of the anatomical structure, including the identified anatomical landmarks, is reconstructed based on the processed MSCT image data and the output of the trained artificial intelligence module, e.g., via virtual 3D model reconstruction module 118. Based on the 3D model reconstruction, at step 1008, measurements of the anatomical structure and landmarks may be derived to facilitate preoperative planning, e.g., via anatomical measurement determination module 118. For example, derived measurements may include area-based diameter, perimeter-based diameter, minimum diameter, maximum diameter, depth, distances between landmarks, etc.

At step 1010, the virtual 3D model reconstruction may be displayed, e.g., via display generation module 122, on a screen of platform 100 or on an external computing device viewable by the user. For example, the 3D model reconstruction may be displayed with the identified anatomical landmarks overlaid on the 3D model, such that they are easily identifiable by the user. Moreover, the 3D model reconstruction may be displayed alongside the respective derived measurements of the anatomical landmarks. Accordingly, the user may make adjustments/corrections to the derived measurements and/or request additional measurements, e.g., via user interface 108.

At step 1012, information indicative of specifications/dimensions or one or more implantable devices may be obtained from a database, e.g., via implantable device specification module 120, and may be displayed on a screen of platform 100 or on an external computing device viewable by the user. For example, implantable device specification module 120 may generate and display an implantable device sizing chart with information regarding the derived patient-specific anatomical measurements, as well as the size range capabilities of various implantable devices, such that the user may select the appropriate implantable device for the patient based on the sizing chart.

Optionally, upon selection of the implantable device by the user, e.g., via user interface 108, at step 1014, a virtual 3D model of the implantable device may be obtained from the database, and virtually displayed within the 3D model reconstruction, e.g., via display generation module 122. Accordingly, platform 100 further may measure mechanical interactions between the virtual implantable device model and the anatomical structure and landmarks within the 3D model reconstruction as well as deformations of the anatomical structures and landmarks due to placement of the virtual implantable device model, such that risks, e.g., development of cardiac conduction abnormalities or hemodynamic compromise as a result of the intervention, may be determined, as described in U.S. patent. Ser. Nos. 11,045,256 and 11,141,220 to Mortier.

Figure 11A:
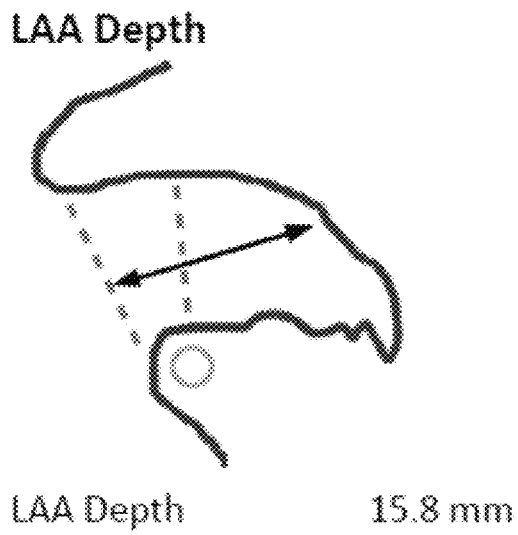
Figure 11B:
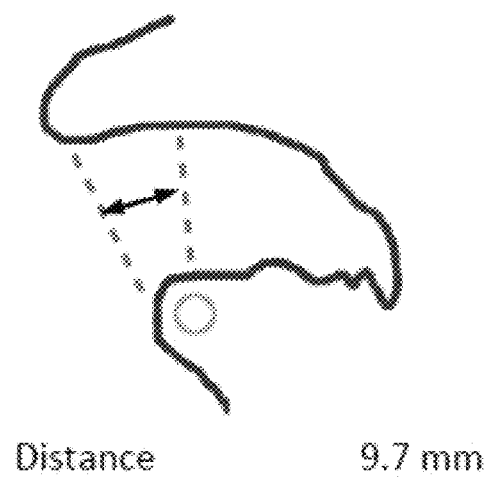

Referring now to FIGS. 11A to 11H, exemplary results of using platform 100 for an LAAO intervention for a given patient are provided. As shown in FIG. 11A, the measured depth of the patient's LAA is 15.8 mm. As shown in FIG. 11B, the measured distance between the patient's ostium and landing zone is 9.7 mm. As shown in FIG. 11C, for the patient's ostium, the measured minimum diameter is 26.2 mm, the measured maximum diameter is 30.8 mm, the measured mean diameter is 28.5 mm, the measured area-based diameter is 28.4 mm, and the measured perimeter-based diameter is 28.6 mm. As shown in FIG. 11D, for the landing zone identified in the patient's LAA, the measured minimum diameter is 17.8 mm, the measured maximum diameter is 20.0 mm, the measured mean diameter is 18.9 mm, the measured area-based diameter is 18.7 mm, and the measured perimeter-based diameter is 18.9 mm.

FIG. 11E illustrates an exemplary implantable device sizing chart for the Amplatzer Amulet (made available by Abbott Laboratories, Chicago, Illinois), based on the derived landing zone diameter measurements of FIG. 11D. Advantageously, platform 100 generates information on determined anatomical measurements of the patient and displays such information on a left atrial appendage occlusion (LAAO) device sizing chart such that the clinician can select the preferred size LAAO device using the measurements. For example, the sizing chart of FIG. 11E illustrates the mean-diameter, the area-based diameter, and the perimeter-based diameter of the patient's landing zone, overlaid on a sizing chart that shows the size ranges available for the Amplatzer Amulet, e.g., 16 mm, 18 mm, 20 mm, 22 mm, 25 mm, 28 mm, 31 mm, and 34 mm. As shown in FIG. 11E, the 20 mm Amplatzer Amulet has a size range capability of between 14 mm and 17 mm, the 22 mm Amplatzer Amulet has a size range capability of 15 mm and 19 mm, and the 25 mm Amplatzer Amulet has a size range capability of 17 mm and 23 mm. Accordingly, the sizing chart illustrates that the 22 mm and 25 mm Amplatzer Amulet devices have a size range capability that could accommodate the patient's landing zone based on the mean-diameter, the area-based diameter, and the perimeter-based diameter of the patient's landing zone. A user, e.g., a physician, viewing the sizing chart of FIG. 11E, may select the Amplatzer Amulet size that is most appropriate for the patient based on the size range capabilities and the patient's landing zone, e.g., the 22 mm or 25 mm Amplatzer Amulet.

As described above, the user may select one or more implantable devices for virtual simulation within the 3D model reconstruction, and platform 100 may generate the simulation and determine device and/or anatomical measurements corresponding thereto. For example, FIG. 11F illustrates a virtual simulation of a 20 mm distal Amplatzer Amulet within the landing zone of the 3D model reconstruction, and FIG. 11G illustrates a virtual simulation of a 22 mm proximal Amplatzer Amulet within the landing zone of the 3D model reconstruction. FIG. 11H illustrates an exemplary summary chart based on various simulations of select Amplatzer Amulet device sizes, e.g., 20 mm distal, 22 mm proximal, 22 mm distal, and 25 mm proximal, placed within the landing zone of the 3D model reconstruction. For example, FIG. 11H illustrates the area-based, perimeter-based, minimum, and maximum diameters of the lobe cross-section for various sized Amplatzer Amulet devices, based on respective simulations. Further, as will be readily apparent to one skilled in the art, while the Amplatzer Amulet left atrial appendage occlusion (LAAO) device is used for illustrative purposes, the platform and charts described herein could be used with any LAAO device.

Figure 12:
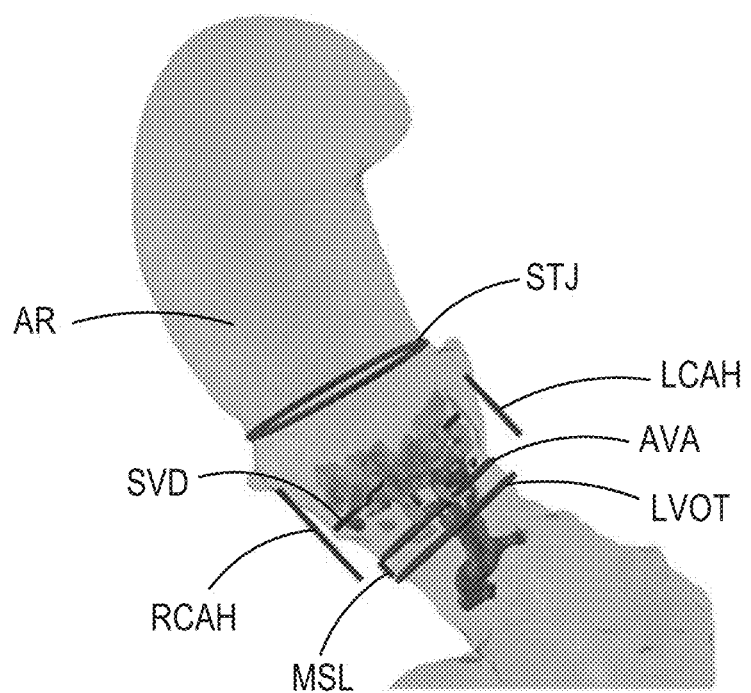
FIG. 12 illustrates an exemplary 3D model reconstruction of an aortic root overlaid with identified anatomical landmarks.

Referring now to FIG. 12, a 3D model reconstruction of an aortic root and left ventricular outflow path is provided. As shown in FIG. 12, the 3D model reconstruction may be overlaid with the identified anatomical landmarks and derived anatomical measurements including, for example, aortic root AR, sino-tubular junction STJ, sinus of Valsalva diameter SVD, left coronary artery height LCAH, right coronary artery height RCAH, aortic valve annulus AVA, left ventricular outflow tract LVOT, and membranous septum length MSL.

Figure 13A:
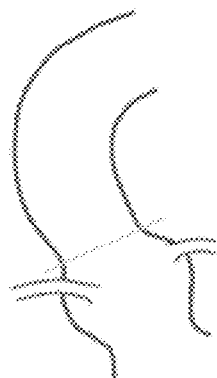
Figure 13A:
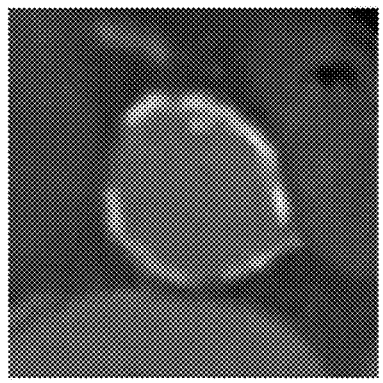
Figure 13B:
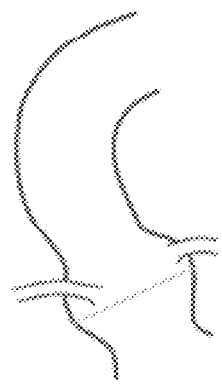
Figure 13B:
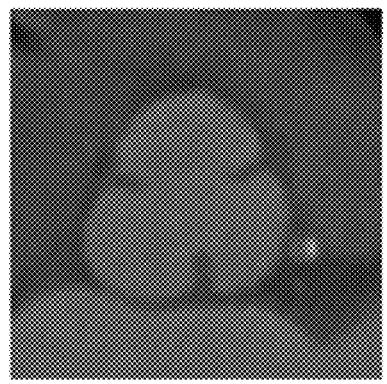

Referring now to FIGS. 13A to 13M, exemplary results of using platform 100 for a TAVR intervention for a given patient are provided. As shown in FIG. 13A, for the patient's sino-tubular junction, the measured area is 451.3 mm$^2$, the measured perimeter is 76.3 mm, the measured minimum diameter is 21.8 mm, the measured maximum diameter is 25.5 mm, the measured mean diameter is 23.6 mm, the measured area-based diameter is 24.0 mm, and the measured perimeter-based diameter is 24.3 mm. As shown in FIG. 13B, for the patient's sinus of Valsalva, the measured left is 28.2 mm, the measured right is 31.1 mm, the measured non is 31.1 mm, and the measured average is 29.5 mm.

As shown in FIG. 13C, for the patient's aortic annulus, the measured area is 314.5 mm$^2$, the measured perimeter is 65.1 mm, the measured minimum diameter is 18.2 mm, the measured maximum diameter is 23.2 mm, the measured mean diameter is 20.7 mm, the measured area-based diameter is 20.0 mm, and the measured perimeter-based diameter is 20.7 mm. As shown in FIG. 13D, for the patient's LVOT, the measured area is 249.0 mm$^2$, the measured perimeter is 58.9 mm, the measured minimum diameter is 15.0 mm, the measured maximum diameter is 21.6 mm, the measured mean diameter is 18.3 mm, the measured area-based diameter is 17.8 mm, and the measured perimeter-based diameter is 18.8 mm.

FIG. 13E illustrates an exemplary implantable device sizing chart for the Evolut PRO+(made available by Medtronic, Dublin, Ireland), based on the derived aortic annulus diameter measurements of FIG. 13C. Advantageously, platform 100 generates information on determined anatomical measurements of the patient and displays such information on a prosthetic heart valve sizing chart such that the clinician can select the preferred size of the device (e.g., TAVR, TMVR) using the measurements. For example, the sizing chart of FIG. 13E illustrates the mean-diameter, the area-based diameter, and the perimeter-based diameter of the patient's aortic annulus, as well as the size range capabilities of various sizes of the Evolut PRO+, e.g., 23 mm, 26 mm, 29 mm, and 34 mm Evolut PRO+ devices. As shown in FIG. 13E, the 23 mm Evolut PRO+ has a size range capability of between 18 mm and 20 mm, the 26 mm Evolut PRO+ has a size range capability of 20 mm and 23 mm. Accordingly, the sizing chart illustrates that the 23 mm and 26 mm Evolut PRO+ devices have a size range capability that could accommodate the patient's aortic annulus based on the mean-diameter, the area-based diameter, and the perimeter-based diameter of the patient's aortic annulus. A user, e.g., a physician, viewing the sizing chart of FIG. 13E, may select the Evolut PRO+ size that is most appropriate for the patient based on the size range capabilities and the patient's aortic annulus, e.g., the 23 mm or 26 mm Evolut PRO+.

Figure 13F:
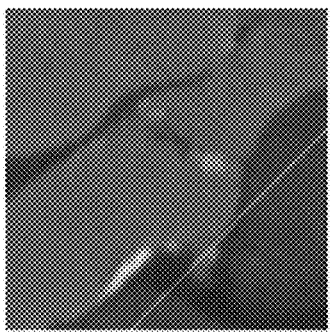
FIGS. 13F to 13J illustrate additional various measurements of an aortic root.
Figure 13G:
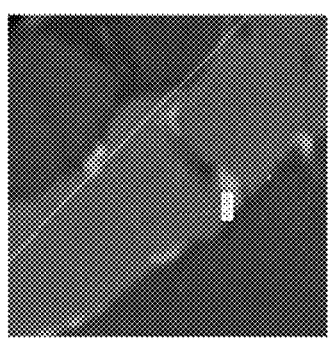
Figure 13H:
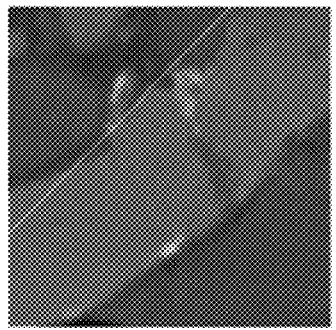
Figure 13I:
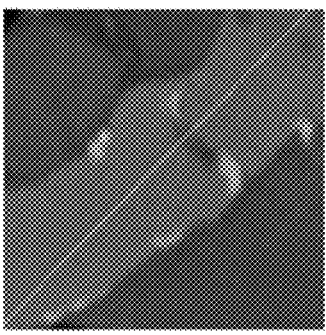
Figure 13J:
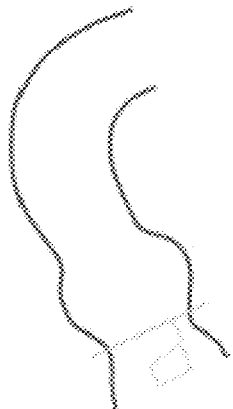
Figure 13J:
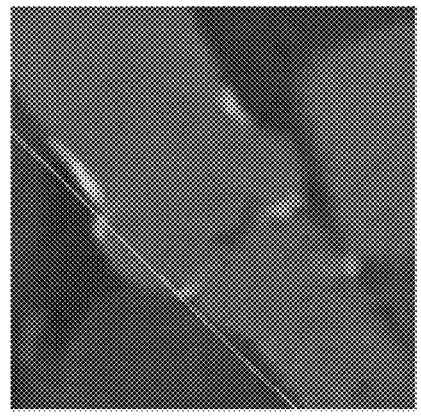
Figure 13K:
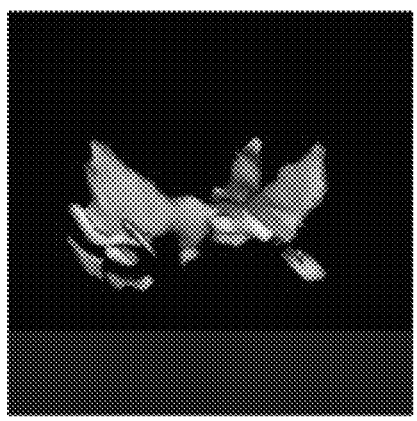
FIG. 13K illustrates a 3D reconstruction of calcified valve morphology.
Figure 13K:
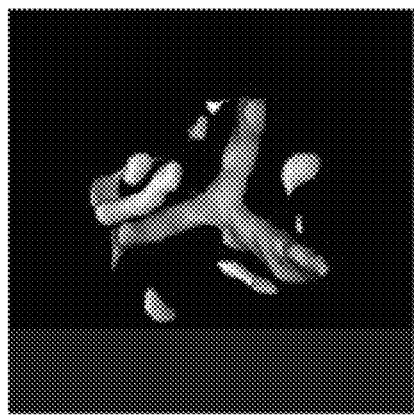

FIGS. 13F to 13J illustrate additional measurements that may be derived for preoperative planning for TAVR. For example, as shown in FIG. 13F, the measured left coronary distance is 14.0 mm. As shown in FIG. 13G, the measured right coronary distance is 15.6 mm. As shown in FIG. 13H, the measured sino-tubular junction distance is 17.4 mm. As shown in FIG. 13I, the measured aortic arch angulation is 45.5°. As shown in FIG. 13J, the measured membranous septum length is 2.4 mm. FIG. 13K illustrates a 3D reconstruction of calcified morphology of an aortic valve.

Figures 13L, 13M:
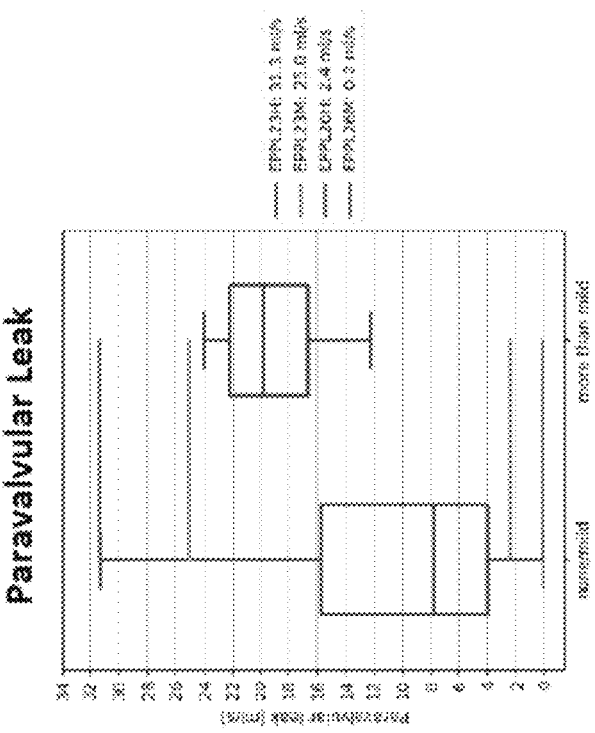
FIG. 13L illustrates an exemplary implantable device simulation results chart for transcatheter aortic valve implantation.
FIG. 13M is a graph illustrating predicted paravalvular leak based on transcatheter aortic valve implantation simulation.

As described above, the user may select one or more implantable devices for virtual simulation within the 3D model reconstruction, and platform 100 may generate the simulation and determine device and/or anatomical measurements corresponding thereto. For example, FIG. 13L illustrates an exemplary summary chart based on various simulations of select Evolut PRO+ device sizes, e.g., two 23 mm Evolut PRO+ devices and two 26 mm Evolut PRO+ devices, placed within the aortic annulus of the 3D model reconstruction. For example, FIG. 13L illustrates the implantation depths, paravalvular leak (PVL), and contact pressure index for various sized Evolut PRO+ devices, based on respective simulations. FIG. 13M is a graph illustrating paravalvular leak based on the simulations of FIG. 13L. Further, as will be readily apparent to one skilled in the art, while the Evolut PRO+ prosthetic heart valve is used for illustrative purposes, the platform and charts described herein could be used with any prosthetic heart valve.

Experimental Results

The purpose of this study was to investigate the feasibility of a fully automated artificial intelligence (AI)-based MSCT analysis for planning structural heart interventions, focusing on left atrial appendage occlusion (LAAO) as the selected use case. Different deep learning models were trained, validated, and tested using a large cohort of patients for which manually annotated data was available. Good machine learning practices were applied during this study, e.g. regarding data management. These models were used independently or in combination to detect the anatomical ostium, the landing zone, the mitral valve annulus and the fossa ovalis, and to segment the left atrium (LA) and left atrial appendage (LAA). The accuracy of the models was evaluated through comparison with the manually annotated data.

As a result of the study, the predicted segmentation of the LAA was similar to the manual segmentation (Dice score of 0.94±0.02). The difference between the automatically predicted and manually measured perimeter-based diameter was −0.8±1.3 mm (anatomical ostium), −1.0±1.5 mm (Amulet landing zone) and −0.1±1.3 mm (Watchman FLX landing zone), which is similar to the operator variability on these measurements. Finally, the detected mitral valve annulus and fossa ovalis was close to the manual detection of these landmarks, as shown by the Hausdorff distance (respectively 3.9±1.2 mm and 4.8±1.8 mm). The average runtime of the complete workflow, including data pre- and post-processing was 57.5±34.5 seconds.

Specifically, this retrospective study was performed using MSCT images acquired for the preoperative planning of the LAAO. The patient cohort is characterized by a mean age of 76.5±7.9 years, and 44.9% male and 24.7% female patients (gender unknown in 30.4% of the patients).

As described above, a typical MSCT analysis for the pre-procedural planning of LAAO involves several aspects. The size of the left atrial appendage (LAA) is assessed by identifying the 3D planes defining the entrance of the LAA (i.e. anatomical ostium) and a device-specific landing zone, and by performing measurements in these planes. The depth of the appendage is also measured, to understand if the LAA is deep enough to host the selected device. To plan the transseptal puncture site, the fossa ovalis is identified as a 3D curve on the interatrial septum. Locating the mitral valve annulus also may be useful to assess whether there could be any potential interaction between the implanted occluder and the mitral valve. Finally, a 3D model reconstruction of the left atrium (LA) and the LAA may be generated through image segmentation techniques to better understand the patient's anatomy.

For this study, manually annotated or "ground truth" data was produced by trained professionals for all the above-mentioned landmarks and the 3D segmentation of the LAA, using the Materialise Mimics Innovation Suite 21 (made available by Materialise, Leuven, Belgium). Not all annotations are available for all patients as some were added at a later stage of the study. For 25 patients, three trained professionals identified the ostium and landing zone planes independently and performed the related measurements. This provides inter-operator variability data that allows to correctly interpret the accuracy of the deep learning models.

For each deep learning application, the amount of data used for the training, validation and testing of the deep learning models was respectively 80%, 10% and 10%. Data was randomly distributed over these three different groups. The train and validate sets are used during the training and hyper-parameter optimization of the deep learning models, while the test set is an "unseen" dataset used to assess model accuracy. There was the additional condition that a fixed group of 25 (random) patients were used in the test set of all applications. These 25 patients are used in the inter-operator variability study to assess the accuracy of the automated ostium and landing zone plane detection and the related anatomical measurements.

Depending on the deep learning application, the prediction is evaluated using different metrics. Segmentations are evaluated by the Sørensen—Dice coefficient, while for point detections, the Euclidean distance between the prediction and ground truth is used. The curve detection models are assessed with the Euclidean distance between the centroids of the predicted and ground truth curves. This metric provides information about the accuracy of the location of the detected curve. In addition, the Hausdorff distance and the difference in diameter of the predicted and ground truth curve are calculated to assess the accuracy of the shape of the curve. The detected planes are evaluated using the angle between the predicted and ground truth plane. In addition, the Euclidean distance between the centroid of the closed curve describing the boundary of the appendage in the predicted and ground truth planes is calculated to assess the location error.

The automated analysis was completed for the patients included in the test cohorts (n=25). The average runtime of the complete workflow, including data pre- and post-processing was 57.5±34.5 seconds when executed on a GPU server with 4 GPUs (2× Nvidia GeForce RTX 2080 ti, 1× Nvidia GeForce RTX 2070 SUPER and 1× GeForce GTX TITAN X) and 64 GB RAM, using TorchServe [12]. The accuracy of the different applications is provided in the following paragraphs.

The segmentation mask of the LAA resulting from the deep learning models and the image analysis techniques is evaluated for the 25 patients on whom the inter operator variability study was performed. The mean Dice score is 0.94±0.02.

The prediction of the anatomical ostium and landing zone planes, as well as the resulting anatomical measurements, are evaluated using the inter-operator variability data that was conducted on 25 patients. Table 1 below provides an overview of all the results using the data from observer 1 as the comparator. Specifically, Table 1 illustrates the differences between the manual analysis from observer 1 (obs1), the model predictions and the manual analyses of observer 2 (obs2) and 3 (obs3), wherein the differences are reported as mean±standard deviation. It can be observed that the differences between the model predictions and observer 1 are very similar to the differences between the different observers, both in terms of the derived measurements as well as for the location and orientation of the detected planes.

TABLE 1

|  | Model vs obs1 | Obs2 vs obs1 | Obs3 vs obs1 |
| --- | --- | --- | --- |
| Anatomical ostium plane | | | |
| Area-based diameter [mm] | −0.8 ± 1.3 | −0.8 ± 1.2 | −0.4 ± 1.1 |
| Perimeter-based diameter [mm] | −0.8 ± 1.3 | −0.8 ± 1.3 | −0.4 ± 1.2 |
| Maximal diameter [mm] | −0.9 ± 2.0 | −0.9 ± 1.6 | −0.6 ± 1.6 |
| Minimal diameter [mm] | −0.6 ± 1.1 | −0.6 ± 1.1 | −0.1 ± 0.8 |
| Centroid [mm] | 1.9 ± 1.0 | 1.9 ± 0.9 | 1.7 ± 0.7 |
| Angle [°] | 6.5 ± 2.9 | 6.0 ± 3.0 | 6.5 ± 3.4 |
| Landing zone plane (Amulet) | | | |
| Area-based diameter [mm] | −0.9 ± 1.5 | −0.2 ± 0.6 | 0.3 ± 1.0 |
| Perimeter-based diameter [mm] | −1.0 ± 1.5 | −0.2 ± 0.6 | 0.3 ± 1.0 |
| Maximal diameter [mm] | −1.2 ± 2.0 | −0.4 ± 1.1 | 0.2 ± 1.3 |
| Minimal diameter [mm] | −0.6 ± 1.7 | 0.0 ± 0.9 | 0.6 ± 0.9 |
| Centroid [mm] | 1.8 ± 1.1 | 1.7 ± 0.9 | 1.5 ± 0.8 |
| Angle [°] | 8.3 ± 5.1 | 6.6 ± 3.7 | 8.9 ± 3.6 |
| Landing zone plane (Watchman FLX) | | | |
| Area-based diameter [mm] | −0.1 ± 1.2 | 0.2 ± 1.0 | 0.7 ± 0.9 |
| Perimeter-based diameter [mm] | −0.1 ± 1.3 | 0.1 ± 1.1 | 0.8 ± 1.0 |
| Maximal diameter [mm] | 0.1 ± 1.7 | 0.2 ± 1.9 | 0.9 ± 1.5 |
| Minimal diameter [mm] | −0.2 ± 1.4 | 0.0 ± 0.9 | 0.6 ± 1.0 |
| Centroid [mm] | 1.8 ± 1.5 | 2.0 ± 1.3 | 2.0 ± 1.0 |
| Angle [°] | 7.8 ± 5.1 | 7.7 ± 4.7 | 8.4 ± 4.9 |

Figure 14A:
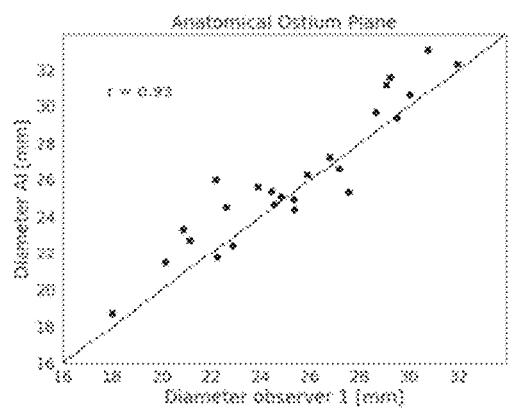
FIGS. 14A to 14F are graphs illustrating comparisons between measurements of various identified anatomical landmarks derived manually and via an exemplary artificial intelligence module.
Figure 14B:
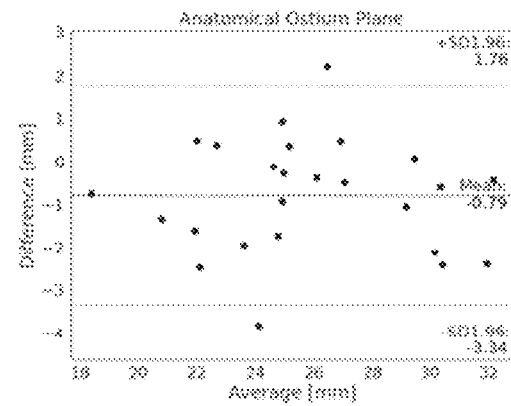
Figure 14C:
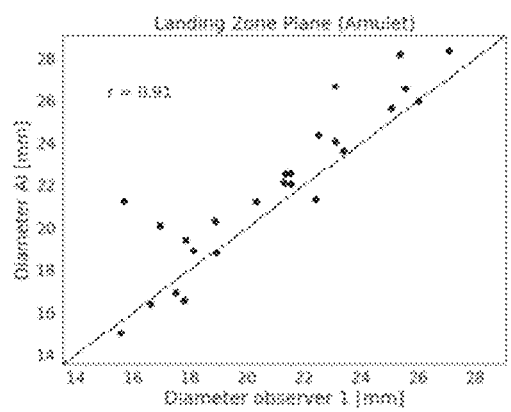
Figure 14D:
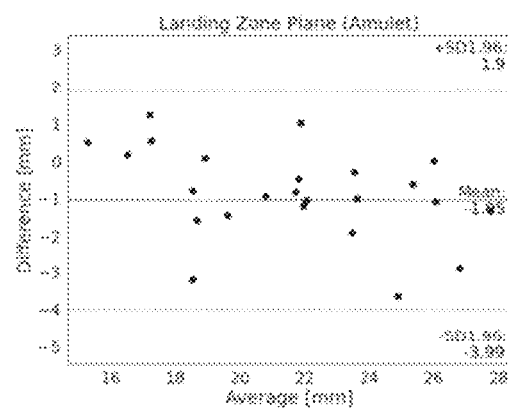
Figure 14E:
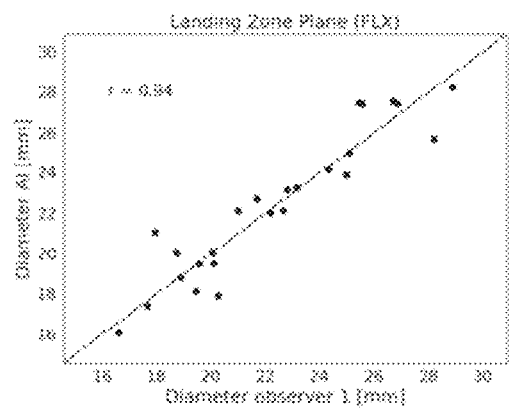
Figure 14F:
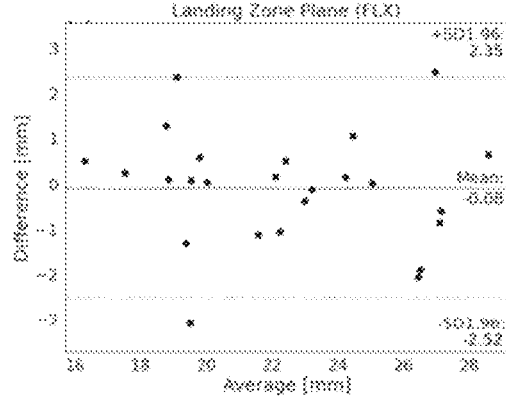

FIGS. 14A to 14F are Scatter and Bland-Altman plots for the perimeter-based diameter at the ostium and the different landing zone planes, for comparison between the AI models and one of the manually identified measurements. FIGS. 14A and 14B are graphs of the results for the perimeter-based diameter of the anatomical ostium cross section. FIGS. 14C and 14D are graphs of the results for the perimeter-based diameter of the landing zone for an Amplatzer Amulet. FIGS. 14E and 14F are graphs of the results for the perimeter-based diameter of the landing zone for a Watchman FLX. FIGS. 14A, 14C, and 14E are scatter plot graphs with R Pearson coefficient, and FIGS. 14B, 14D, and 14F are graphs illustrating Bland-Altman analysis with mean value and limits of agreement.

Figure 15A:
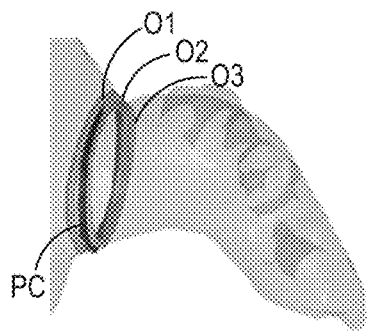
FIG. 15A illustrates an exemplary anatomical ostium curve in a detected plane.
Figure 15B:
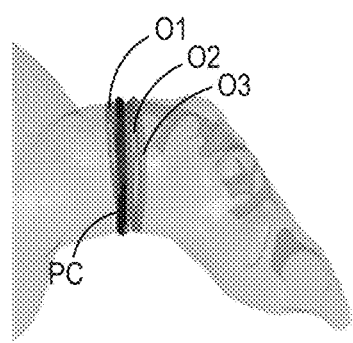
FIGS. 15B and 15C illustrate exemplary landing zone curves in respective detected planes for various implantable devices.
Figure 15C:
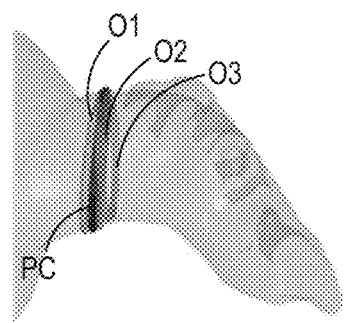

FIGS. 15A to 15C show the manually identified and predicted curves for one randomly selected patient. Specifically, FIG. 15A illustrates predicted curve PC, and manual curves O1, O2, and O3 from three different observers for the patient's anatomical ostium. FIG. 15B illustrates predicted curve PC, and manual curves O1, O2, and O3 from three different observers for the patient's landing zone for the Amplatzer Amulet. FIG. 15C illustrates predicted curve PC, and manual curves O1, O2, and O3 from three different observers for the patient's landing zone for the Watchman FLX.

Figure 15D:
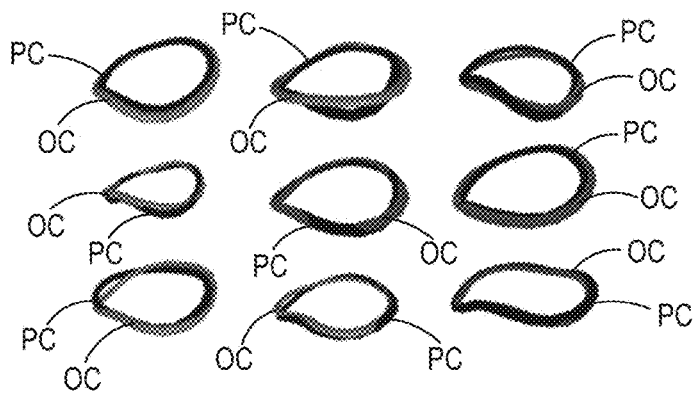
FIG. 15D illustrates mitral valve annulus curves for nine randomly selected patients of an exemplary test dataset.

The mean diameter difference of the detected mitral valve annulus is 0.1±0.9 mm for the test set, while the mean Hausdorff distance is 3.9±1.2 mm. This means that the shape of the predicted mitral valve annulus is accurately predicted. The location error is represented by the mean distance error between the ground truth and the centroids of the predicted curve. This error is 1.2±0.8 mm and confirms the location accuracy of the predicted curve. FIG. 15D shows a qualitative comparison of predicted curves PC of the mitral annulus and ground truth curves OC of the mitral annulus manually detected by an observer for nine randomly selected patients included in the test set.

Figure 15E:
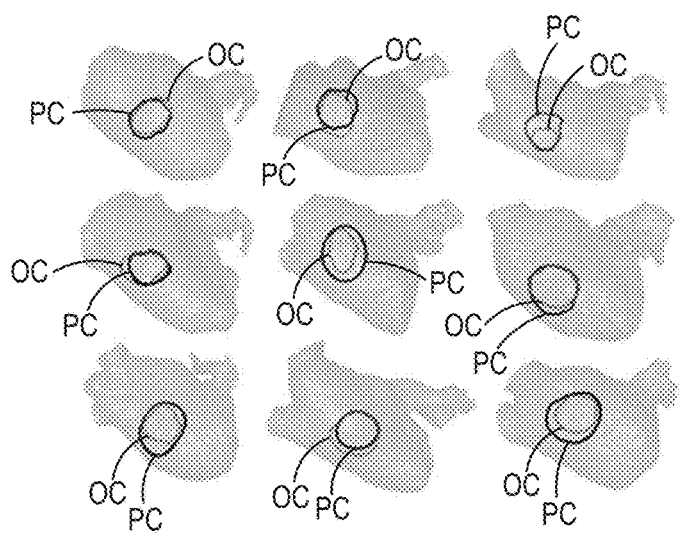
FIG. 15E illustrates fossa ovalis curves for nine randomly selected patients of an exemplary test dataset.

For the test set, the fossa ovalis mean diameter difference is −2.7±4.2 mm, with a Hausdorff distance of 6.7±5.1 mm). The Euclidean distance error on the centroid of the curve is 4.1±5.0 mm. Notably, the region of the fossa ovalis is clearly visible only if there is sufficient contrast filling in the right atrium. The MSCT acquisition protocols vary from center to center, and not for all patients the contrast sufficiently reaches the right atrium for a proper fossa ovalis identification. This explains why for the fossa ovalis the performance of the model is lower than for the mitral annulus. When excluding from the analysis the 4 DICOM datasets with poor contrast filling in the right heart, the mean diameter difference is reduced to −2.1±3.0 mm, with a Hausdorff distance of 4.8±1.4 mm. The Euclidean distance error on the centroid of the curve is 2.3±1.0 mm. FIG. 15E shows a qualitative comparison of the predicted curves PC of the fossa ovalis and ground truth curves OC of the fossa ovalis manually detected by an observer for nine randomly selected patients included in the test set.

In this study, a framework consisting of several AI-based applications is presented to allow for the automatic anatomical analysis needed for the preoperative planning of the LAAO. No interaction or input was required to generate the results. The proposed method is based on MSCT scans, which provide high spatial resolution. The availability of larger portions of the heart compared to 3D echocardiography allows the inclusion of relevant structures such as the fossa ovalis contour, for transseptal puncture planning. Alternatively or additionally, the proposed methods may be based on other imaging modalities such as 3D echocardiography or MRI. The presented framework is fast (i.e., 1 minute vs 10-15 minutes of manual work), accurate and is built on a large database (>500 unique MSCT scans), providing a solid base for the AI-based models. This framework easily may be extended to other structural heart disease interventions, e.g., TAVR, TMVR, TPVR, TTVR, etc. The availability of such an analysis for physicians ensures a fast and accurate anatomical analysis, which is crucial for a successful and efficient LAAO procedure.

Clinically, as the LAAO procedure is still not as widespread as TAVR, the learning curve of pre-procedural planning in low-volume centers can be long and difficult. The availability of an automatic tool for the preoperative anatomical analysis may not only result in more standardization across different operators but may also shorten the learning curve during initiation of the programs.

As described above, all the results presented here are calculated in a fully automated manner, to prove the accuracy of the models. When the deep learning applications described are translated into clinical practice tools, the interaction with the user or the physician remains fundamental. As the pre-operative planning of a procedure relies on the extensive experience of the operator, the physician should always be able to interact with the provided results, and to modify them if needed. For example, a way to deliver the AI results would be the inclusion of the described models into a user-friendly interface, where the operator can inspect, review and modify the pre-operative landmarks and measurements if needed.

The work presented for LAAO pre-procedural planning serves as a use case to demonstrate the availability, accuracy and speed of the developed AI-based applications. Additional features to the workflow can be easily integrated, to expand the pre-operative planning even further. Relevant additions are the LAA centerline detection, to understand the tortuosity of anatomies, the positioning of the delivery system, to investigate the trajectory between the transseptal puncture location and the access to the LAA, and computational simulations to calculate the physical interaction between the virtually deployed device and the anatomical structures.

The approach, which may be easily extended to other structural heart interventions, may help to handle the rapidly increasing volumes of patients, to speed up the manual process of anatomical analysis and to facilitate the pre-operative planning for transcatheter procedures. For example, similar algorithms may be used for other interventions, where pre-operative planning of transcatheter procedures based on MSCT images is mandatory. For TAVR, this may be very useful considering the large number of MSCT analyses that need to be performed in high-volume centers. It also has the potential to significantly speed up the planning of procedures such as TMVR, where multiple analyses at different phases of the cardiac cycle are required, resulting in a relatively time-consuming process.

While various illustrative embodiments of the invention are described above, it will be apparent to one skilled in the art that various changes and modifications may be made therein without departing from the invention. For the purpose of clarity and a concise description features are described herein as part of the same or separate embodiments, however, alternative embodiments having combinations of all or some of the features described in these separate embodiments are also envisaged. The appended claims are intended to cover all such changes and modifications that fall within the true scope of the invention.

What is claimed:

1. A computerized method for automated anatomical analysis of an anatomical structure, the method comprising:
obtaining a plurality of images of patient-specific cardiovascular anatomy, said plurality of images comprising a plurality of voxels;
analyzing the plurality of images with a trained artificial intelligence module to identify one or more anatomical landmarks and to construct a virtual three-dimensional model of the anatomical structure, wherein analyzing the plurality of images with the trained artificial intelligence module comprises:

generating a probability mask, the probability mask comprising a probability value for each voxel of the plurality of voxels, the probability value indicating a probability that said voxel corresponds to the anatomical structure;

converting the probability mask to a segmentation mask by comparing each probability value to a threshold value on a voxel-by-voxel basis to assign each voxel of the plurality of voxels a predetermined label corresponding to the anatomical structure if such probability value exceeds the threshold value; and generating a segmentation mask comprising each voxel of the plurality of voxels assigned the predetermined label; and constructing the virtual three-dimensional model of the anatomical structure based on the segmentation mask;

deriving anatomical measurements based on the one or more identified anatomical landmarks;

obtaining specifications of a plurality of implantable devices associated with the anatomical structure;

displaying a sizing chart based on the specifications of the plurality of implantable devices and on the anatomical measurements;

receiving input from a user comprising a selection of an implantable device from the plurality of implantable devices; and displaying the virtual three-dimensional model of the anatomical structure alongside the anatomical measurements of the one or more identified anatomical landmarks and a virtual model of the selected implantable device.

2. The computerized method of claim 1, wherein the anatomical structure is a left atrium and left atrial appendage.

3. The computerized method of claim 2, wherein the one or more anatomical landmarks comprise an ostium and a predetermined landing zone within the anatomical structure for a cardiac implantable device.

4. The computerized method of claim 3, wherein deriving anatomical measurements based on the one or more identified anatomical landmarks comprises identifying 3D planes defining the ostium and the predetermined landing zone, and performing measurements in the 3D planes.

5. The computerized method of claim 3, wherein deriving anatomical measurements based on the one or more identified anatomical landmarks comprises measuring a depth of the left atrial appendage.

6. The computerized method of claim 2, wherein the one or more anatomical landmarks further comprise a fossa ovalis, such that the fossa ovalis is identified as a 3D curve on an interatrial septum via the trained artificial intelligence module.

7. The computerized method of claim 6, further comprising planning a transseptal puncture site based on the identified fossa ovalis.

8. The computerized method of claim 2, wherein the one or more anatomical landmarks further comprise a mitral valve annulus.

9. The computerized method of claim 1, wherein the anatomical structure is an aortic root.

10. The computerized method of claim 9, wherein the one or more anatomical landmarks comprise an aortic annulus, a left ventricular outflow tract, a sino-tubular junction, or a sinus of Valsalva.

11. The computerized method of claim 10, wherein deriving anatomical measurements based on the one or more identified anatomical landmarks comprises measuring at least one of left coronary distance, right coronary distance, sino-tubular junction distance, aortic arch angulation, or membranous septum length.

12. The computerized method of claim 1, wherein obtaining the plurality of images of patient-specific cardiovascular anatomy comprises obtaining a plurality of multi-slice computed tomography images of patient-specific cardiovascular anatomy.

13. The computerized method of claim 12, further comprising pre-processing the plurality of multi-slice computed tomography images by resampling a volume of the multi-slice computed tomography images to an isotropic resolution and voxel size.

14. The computerized method of claim 1, wherein analyzing the plurality of images with the trained artificial intelligence module to identify one or more anatomical landmarks comprises executing at least one deep learning module selected from a list consisting of: segmentation, point detection, curve detection, and plane detection.

15. The computerized method of claim 1, wherein assigning the predetermined label to each voxel of the plurality of voxels if the probability value exceeds the threshold value comprises binarizing the probability mask for a predefined class such that each voxel with a probability value below the threshold value is set to label zero and each voxel with a probability value above the threshold value is set to label one, and wherein the segmentation mask comprises each voxel having label one.

16. The computerized method of claim 1, further comprising combining the segmentation mask with one or more second segmentation masks obtained using an image analysis technique.

17. The computerized method of claim 16, wherein the image analysis technique is flooding.

18. The computerized method of claim 14, wherein executing the point detection deep learning module comprises:

generating a second probability mask indicative of a second probability value that each voxel of a plurality of voxels of the plurality of images is a predetermined label defined by a predefined spherical region around a predefined point;

assigning the predetermined label to each voxel if the second probability value exceeds a second threshold; and obtaining a 3D point by taking a centroid of all voxels having the predetermined label to identify the one or more anatomical landmarks.

19. The computerized method of claim 18, wherein identifying the one or more anatomical landmarks further comprises cropping the plurality of images around the 3D point.

20. The computerized method of claim 14, wherein executing the curve detection deep learning module comprises:

generating a second probability mask indicative of a second probability value that each voxel of a plurality of voxels of the plurality of images is a predetermined label defined by a curve formed by sweeping a sphere having a predetermined radius along the curve for one of the one or more anatomical landmarks;

assigning the predetermined label to each voxel if the second probability value exceeds a second threshold; and identifying a 3D curve by using a graph-based technique on all voxels having the predetermined label.

21. The computerized method of claim 14, wherein executing the plane detection deep learning module comprises:
assigning each voxel of a plurality of voxels one of two or more predetermined labels; and
extracting a connecting boundary between each voxel based on the assigned predetermined labels of each voxel using an image processing technique to fit a plane.

22. The computerized method of claim 21, wherein deriving anatomical measurements based on the one or more identified anatomical landmarks comprises deriving a closed curve indicative of a boundary of the anatomical structure in the plane to calculate at least one of area-based, perimeter-based, minimum, and maximum diameters of the one or more identified anatomical landmarks.

23. The computerized method of claim 1, wherein deriving anatomical measurements based on the one or more identified anatomical landmarks comprises deriving anatomical measurements of the one or more identified anatomical landmarks from the virtual three-dimensional model of the anatomical structure.

24. The computerized method of claim 1, wherein the identified anatomical landmarks are overlaid on the anatomical structure in the virtual three-dimensional model of the anatomical structure.

25. The computerized method of claim 1, further comprising:
receiving user input feedback based on the displayed virtual three-dimensional model; and
adjusting the anatomical measurements based on the user input feedback.

26. A system for automated anatomical analysis of an anatomical structure, the system comprising:
a memory having instructions that when executed by a processor operatively coupled to a computer, cause the computer to:
obtain a plurality of images of patient-specific cardiovascular anatomy, said plurality of images comprising a plurality of voxels;
analyze the plurality of images with a trained artificial intelligence module to identify one or more anatomical landmarks and to construct a virtual three-dimensional model of the anatomical structure, wherein to analyze the plurality of images with the trained artificial intelligence module comprises:
(i) generate a probability mask, the probability mask comprising a probability value for each voxel of the plurality of voxels, the probability value indicating a probability that said voxel corresponds to the anatomical structure;
(ii) convert the probability mask to a segmentation mask by comparing each probability value to a threshold value on a voxel-by-voxel basis to assign each voxel of the plurality of voxels a predetermined label corresponding to the anatomical structure if such probability value exceeds the threshold value; and
(iii) generate a segmentation mask comprising each voxel of the plurality of voxels assigned the predetermined label; and
(iv) construct the virtual three-dimensional model of the anatomical structure based on the segmentation mask;
derive anatomical measurements based on the one or more identified anatomical landmarks;
obtain specifications of a plurality of implantable devices associated with the anatomical structure;
display a sizing chart based on the specifications of the plurality of implantable devices and on the anatomical measurements;
receive input from a user comprising a selection of an implantable device from the plurality of implantable devices; and
display the virtual three-dimensional model of the anatomical structure alongside the anatomical measurements of the one or more identified anatomical landmarks and a virtual model of the selected implantable device.

27. A non-transitory computer readable medium programmed with instructions that, when executed by a processor of a computer, cause the computer to:
obtain a plurality of images of patient-specific cardiovascular anatomy, said plurality of images comprising a plurality of voxels;
analyze the plurality of images with a trained artificial intelligence module to identify one or more anatomical landmarks and to construct a virtual three-dimensional model of the anatomical structure, wherein to analyze the plurality of images with the trained artificial intelligence module comprises:
generate a probability mask, the probability mask comprising a probability value for each voxel of the plurality of voxels, the probability value indicating a probability that said voxel corresponds to the anatomical structure;
convert the probability mask to a segmentation mask by comparing each probability value to a threshold value on a voxel-by-voxel basis to assign each voxel of the plurality of voxels a predetermined label corresponding to the anatomical structure if such probability value exceeds the threshold value; and
generate a segmentation mask comprising each voxel of the plurality of voxels assigned the predetermined label; and
construct the virtual three-dimensional model of the anatomical structure based on the segmentation mask;
derive anatomical measurements based on the one or more identified anatomical landmarks;
obtain specifications of a plurality of implantable devices associated with the anatomical structure;
display a sizing chart based on the specifications of the plurality of implantable devices and on the anatomical measurements;
receive input from a user comprising a selection of an implantable device from the plurality of implantable devices; and
display the virtual three-dimensional model of the anatomical structure alongside the anatomical measurements of the one or more identified anatomical landmarks and a virtual model of the selected implantable device.

28. A computer program product comprising code portions with instructions that, when executed by a processor of a computer, cause the computer to:
obtain a plurality of images of patient-specific cardiovascular anatomy, said plurality of images comprising a plurality of voxels;
analyze the plurality of images with a trained artificial intelligence module to identify one or more anatomical landmarks and to construct a virtual three-dimensional model of the anatomical structure, wherein to analyze the plurality of images with the trained artificial intelligence module comprises:

generate a probability mask, the probability mask comprising a probability value for each voxel of the plurality of voxels, the probability value indicating a probability that said voxel corresponds to the anatomical structure;

convert the probability mask to a segmentation mask by comparing each probability value to a threshold value on a voxel-by-voxel basis to assign each voxel of the plurality of voxels a predetermined label corresponding to the anatomical structure if such probability value exceeds the threshold value; and generate a segmentation mask comprising each voxel of the plurality of voxels assigned the predetermined label; and construct the virtual three-dimensional model of the anatomical structure based on the segmentation mask;

derive anatomical measurements based on the one or more identified anatomical landmarks;

obtain specifications of a plurality of implantable devices associated with the anatomical structure;

display a sizing chart based on the specifications of the plurality of implantable devices and on the anatomical measurements;

receive input from a user comprising a selection of an implantable device from the plurality of implantable devices; and display the virtual three-dimensional model of the anatomical structure alongside the anatomical measurements of the one or more identified anatomical landmarks and a virtual model of the selected implantable device.

* * * * *